(12) United States Patent
Benjamin et al.

(10) Patent No.: US 11,144,681 B2
(45) Date of Patent: Oct. 12, 2021

(54) GENERATIVE DESIGN PIPELINE FOR URBAN AND NEIGHBORHOOD PLANNING

(71) Applicant: AUTODESK, INC., San Rafael, CA (US)

(72) Inventors: David Benjamin, New York, NY (US); James Stoddart, New York, NY (US); Lorenzo Villaggi, New York, NY (US); Danil Nagy, New York, NY (US)

(73) Assignee: AUTODESK, INC., San Rafael, CA (US)

( * ) Notice: Subject to any disclaimer, the term of this patent is extended or adjusted under 35 U.S.C. 154(b) by 340 days.

(21) Appl. No.: 16/181,224

(22) Filed: Nov. 5, 2018

(65) Prior Publication Data

US 2019/0147116 A1    May 16, 2019

Related U.S. Application Data

(60) Provisional application No. 62/584,711, filed on Nov. 10, 2017.

(51) Int. Cl.
*G06F 30/13* (2020.01)
*G06N 3/12* (2006.01)
(Continued)

(52) U.S. Cl.
CPC ............ *G06F 30/13* (2020.01); *G06N 3/126* (2013.01); *G06Q 10/06313* (2013.01);
(Continued)

(58) Field of Classification Search
CPC .. G06F 30/13; G06F 2111/02; G06F 2111/04; G06F 2111/06; G06F 2111/20;
(Continued)

(56) References Cited

U.S. PATENT DOCUMENTS 7,164,883 B2    1/2007  Rappaport et al.
10,255,383 B2   4/2019  Gavini et al.
(Continued)

FOREIGN PATENT DOCUMENTS

CN    2895621 Y  *  5/2007
CN   102750411 A  * 10/2012
(Continued)

OTHER PUBLICATIONS

"From solar constraints to urban design opportunities: Optimization of built form typologies in a Brazilian tropical city", Tathiane A.L. Martins et al.,, Mar. 2014.*
(Continued)

*Primary Examiner* — Kandasamy Thangavelu
(74) *Attorney, Agent, or Firm* — Artegis Law Group, LLP

(57) ABSTRACT

An urban design pipeline automatically generates design options for an urban design project. The urban design pipeline includes a geometry engine and an evaluation engine. The geometry engine analyzes design criteria and design objectives associated with the urban design project and then generates numerous candidate designs that meet the design criteria and optimize the design objectives to varying degrees. The evaluation engine evaluates each candidate design to generate a set of metrics. The geometry engine modifies the candidate designs based on corresponding metrics to generate candidate designs that better meet the design criteria and more effectively achieve the design objectives.

20 Claims, 18 Drawing Sheets

(51) Int. Cl.
*G06Q 40/00* (2012.01)
*G06Q 10/06* (2012.01)
*G06Q 50/16* (2012.01)
*G06F 111/02* (2020.01)
*G06F 111/04* (2020.01)
*G06F 111/06* (2020.01)
*G06F 111/20* (2020.01)
*G06F 3/0481* (2013.01)
*G06F 3/0484* (2013.01)

(52) U.S. Cl.
CPC ........... *G06Q 40/12* (2013.12); *G06Q 50/165* (2013.01); *G06F 3/04815* (2013.01); *G06F 3/04847* (2013.01); *G06F 2111/02* (2020.01); *G06F 2111/04* (2020.01); *G06F 2111/06* (2020.01); *G06F 2111/20* (2020.01)

(58) Field of Classification Search
CPC . G06F 3/04815; G06F 3/04847; G06N 3/126; G06Q 40/12; G06Q 10/06313; G06Q 50/165
See application file for complete search history.

(56) References Cited

U.S. PATENT DOCUMENTS

| | | | |
|---|---|---|---|
| 2010/0106674 | A1 | 4/2010 | McLean et al. |
| 2012/0271784 | A1 | 10/2012 | McLean et al. |
| 2014/0107851 | A1 | 4/2014 | Yoon et al. |
| 2014/0278280 | A1 | 9/2014 | Pardo-Fernandez |
| 2019/0147116 | A1 | 5/2019 | Benjamin et al. |
| 2019/0147117 | A1 | 5/2019 | Benjamin et al. |
| 2019/0147118 | A1 | 5/2019 | Benjamin et al. |
| 2019/0147119 | A1 | 5/2019 | Benjamin et al. |
| 2019/0147120 | A1 | 5/2019 | Benjamin et al. |
| 2019/0347080 | A1 | 11/2019 | Benjamin et al. |
| 2020/0013127 | A1 | 1/2020 | Gozes et al. |
| 2020/0210533 | A1 | 7/2020 | Markiz |

FOREIGN PATENT DOCUMENTS

| | | | | |
|---|---|---|---|---|
| CN | 103020741 A | * | 4/2013 | ............ Y02A 20/402 |
| CN | 104631243 A | * | 5/2015 | ............. E01C 1/002 |
| CN | 105205283 A | | 12/2015 | |
| CN | 105894553 A | | 8/2016 | |
| CN | 106599332 A | | 4/2017 | |
| CN | 106909986 A | | 6/2017 | |
| CN | 107016221 A | * | 6/2017 | ............. G06F 30/13 |
| WO | 2007/073641 A1 | | 7/2007 | |
| WO | 2011/035542 A1 | | 3/2011 | |
| WO | WO 2013161824 A1 | * | 10/2013 | ......... G06F 17/5004 |

OTHER PUBLICATIONS

"Procedural Modeling of Cities", Yoav I H Parish et al., ACM SIGGRAPH 2001.*
"Urbane: A 3D Framework to Support Data Driven Decision Making in Urban Development", Nivan Ferreira et al., IEEE Conference on Visual Analytics Science and Technology 2015.*
"Effect of urban neighborhoods on the performance of building cooling Systems", Stefan Gracik et al., Building and Environment, Mar. 2015.*
"Legible Simplification of Textured Urban Models", Remco Chang et al., IEEE Computer Graphics and Applications, 2008.*
International Search Report for application No. PCT/US2018/060151 dated Mar. 8, 2019.
Shi et al., "A review of Simulation-Based Urban form Generation and Optimization for Energy-Driven Urban Design", Building and Environment, Pergamon Press, Oxford, GB, vol. 121, May 9, 2017, pp. 119-129.
Yusuf, Syed Adnan., "An Evolutionary AI-Based Decision Support System for Urban Regeneration Planning", Chapters 5-7, Mar. 1, 2010, pp. 155-235.
Aliaga et al., "Interactive Example-Based Urban Layout Synthesis", Acm Transactions on Graphics (TOG), ACM, US, vol. 27, No. 5, Dec. 1, 2008, pp. 1-10.
Sven Schneider: "Automatisierte Erzeugung raumlicher Konfigurationen in Architekturund Stadtebau auf Basis sichtbarkeitsbasierter Raumreprasentationen Dissertation", May 31, 2016, pp. 105-169.
Notice of Allowance received for U.S. Appl. No. 16/184,974 dated Mar. 15, 2021, 16 pages.
Partial Search Report for application No. PCT/US2018/060189 dated Apr. 8, 2019.
International Search Report for application No. PCT/US2018/060189 dated Aug. 8, 2019.
Anonymous: "Grid plan—Wikipedia", URL:https://en.wikipedia.org/w/index php?title=Grid plan&oldid=808141305, Nov. 1, 2017, pp. 1-19.
Wang et al., "Restructuring surface tessellation with irregular boundary conditions", Frontiers of Architectural Research, vol. 3, No. 4, Dec. 1, 2014, pp. 337-347.
Non-Final Office action received for U.S. Appl. No. 16/184,975, dated Mar. 24, 2021, 27 pages.
Vanegas et al., "Visualization of Simulated Urban Spaces: Inferring Parameterized Generation of Streets, Parcels, and Aerial Imagery", IEEE May 2009, pp. 424-435.
Hartmann et al., "Content-Aware Re-targeting of Discrete Element Layouts", Hartmann, WSCG 2015 Conference on Computer Graphics, Visualization and Computer Vision, pp. 173-182.
Sosa et al. , "Urban grid forms as a strategy for reducing heat island effects in arid cities", Sustainable Cities and Society, Jul. 2017, pp. 547-556.
Lezama et al., "Vanishing Point Detection in Urban Scenes Using Point Alignments", Image Processing On Line on Jul. 14, 2017, pp. 131-164.
Shen et al., "Urban function connectivity: Characterisation of functional urban streets with social media check-in data", Jun. 2016, pp. 9-21.
Oshima et al., "Geometry reconstruction and mesh generation techniques for acoustic simulations over real-life urban areas using digital geographic information", Acoust. Sci. & Tech. 35, 2014, pp. 108-118.
Non-Final Rejection received for U.S. Appl. No. 16/184,972 dated May 27, 2021, 98 pages.
Urquizo et al., "Metrics of urban morphology and their impact on energy consumption: A case study in the United Kingdom", Energy Research & Social Science, vol. 32, 2017, pp. 193-206.
Marler et al., "The weighted sum method for multi-objective optimization: new insights", Struct Multidisc Optim, DOI 10.1007/s00158-009-0460-7, vol. 41, 2010, pp. 853-862.
"ArcGIS—Wikipedia, the free encyclopedia", retrieved from https://en.wikipedia.org/wiki/ArcGIS, 2016, 9 pages.
Non-Final Office Action received for U.S. Appl. No. 16/184,972, dated May 27, 2021, 37 pages.
Shi et al., "A review of Simulation-Based Urban form Generation and Optimization for Energy-Driven Urban Design", Building and Environment, vol. 121, May 9, 2017, pp. 119-129.
Martins et al., From solar constraints to urban design opportunities: Optimization of built form typologies in a Brazilian tropical city, pp. 43-56.
ArcGIS, Wikipedia, the free encyclopedia, https://en.wikipedia.org/wiki/ArcGIS, 2016, 9 pages.
Urquizo et al.n "Metrics of urban morphology and their impact on energy consumption: A case study in the United Kingdom", 25 pages.
Marler et al., The weighted sum method for multi-objective optimiziation: new insights:, DOI 1031007/s00158-009-0460-7, 21 pages.

* cited by examiner

GENERATIVE DESIGN PIPELINE FOR URBAN AND NEIGHBORHOOD PLANNING

CROSS-REFERENCE TO RELATED APPLICATIONS

This application claims the priority benefit of United States provisional patent application titled, "Generative Design Techniques for Urban and Neighborhood Planning," filed on Nov. 10, 2017 and having Ser. No. 62/584,711. The subject matter of this related application is hereby incorporated herein by reference.

BACKGROUND

Field of the Various Embodiments

Embodiments of the present invention relate generally to computer-aided design technology and, more specifically, to a generative design pipeline for urban and neighborhood planning.

Description of the Related Art

In a typical urban design project, a designer generates a design for developing a property. For example, the designer could plan the development and construction of a number of houses to be built within a housing subdivision. Urban design projects usually are subject to numerous design criteria (including both design constraints and design requirements) as well as numerous design objectives. For example, a design constraint could be that construction for a given urban design project should not occur outside of a specific property boundary. A design requirement could be that the given urban design project should include at least a minimum number of apartment units. A design objective could be that the given urban design project should maximize population density.

When generating a design for an urban design project, a designer typically implements a traditional design process where the designer makes numerous design choices manually and mentally. In that regard, for most urban design projects, the designer has to determine where different buildings should be located on the property based on the various design criteria and design objectives. The designer also has to determine how various roads should traverse the property based on the various design criteria and design objectives. When making these determinations and other design choices based on design criteria and design objectives, designers oftentimes rely on intuition and experience instead of implementing a more objective and deterministic approach. This traditional design process suffers from at least three specific drawbacks.

First, when making design choices, designers usually have difficulty keeping track of the vast number of design criteria and design objectives typically associated with urban design projects. Consequently, designers oftentimes generate designs that do not meet the design criteria very well or do not adequately address all design objectives. In fact, designers sometimes forget to consider certain design criteria or design objectives altogether in their designs.

Second, designers cannot deterministically quantify the degree to which a given design meets a particular design criterion or design objective. Accordingly, there oftentimes is little or no hard data that can be used to validate various design choices can. Consequently, designers cannot make data-informed recommendations to the stakeholders in urban design projects about the best performing designs. Again, in practice, designers typically rely on intuition and experience when recommending designs. However, in so doing, designers can be biased towards familiar designs, leading to a phenomenon known in the art as "design fixation," where a designer habitually generates similar designs.

Third, designers normally cannot make design decisions and determinations quickly due to the large number of design constraints and design objectives to be considered. As a general matter, the traditional design process lacks repeatable components, thereby requiring the designer to start from scratch with each new urban design project. For these reasons, generating designs for urban design projects can take a very long time.

As the foregoing illustrates, what is needed in the art are more effective techniques for generating designs for urban design projects.

SUMMARY

Various embodiments include a computer-implemented method for generating design options for an urban design project, including generating a first geometrical mesh for a first candidate design based on a first design criterion associated with a first region of land, subdividing the first geometrical mesh to generate a first plurality of neighborhoods, populating the first plurality of neighborhoods with a first set of dwelling units, generating a first metric for the first candidate design based on a first objective function, modifying the first candidate design based on the first metric to generate a first design option, and determining that a second metric generated for the first design option based on the first objective function exceeds the first metric, indicating that the first design option is a higher ranked design than the first candidate design.

At least one technological advantage of the disclosed urban design pipeline is that design options are automatically generated that meet the design criteria and achieve the design objectives associated with an urban design project. Accordingly, a designer can generate designs using the urban design pipeline with minimal risk of generating underperforming designs regardless of the number of design criteria and design objectives involved.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
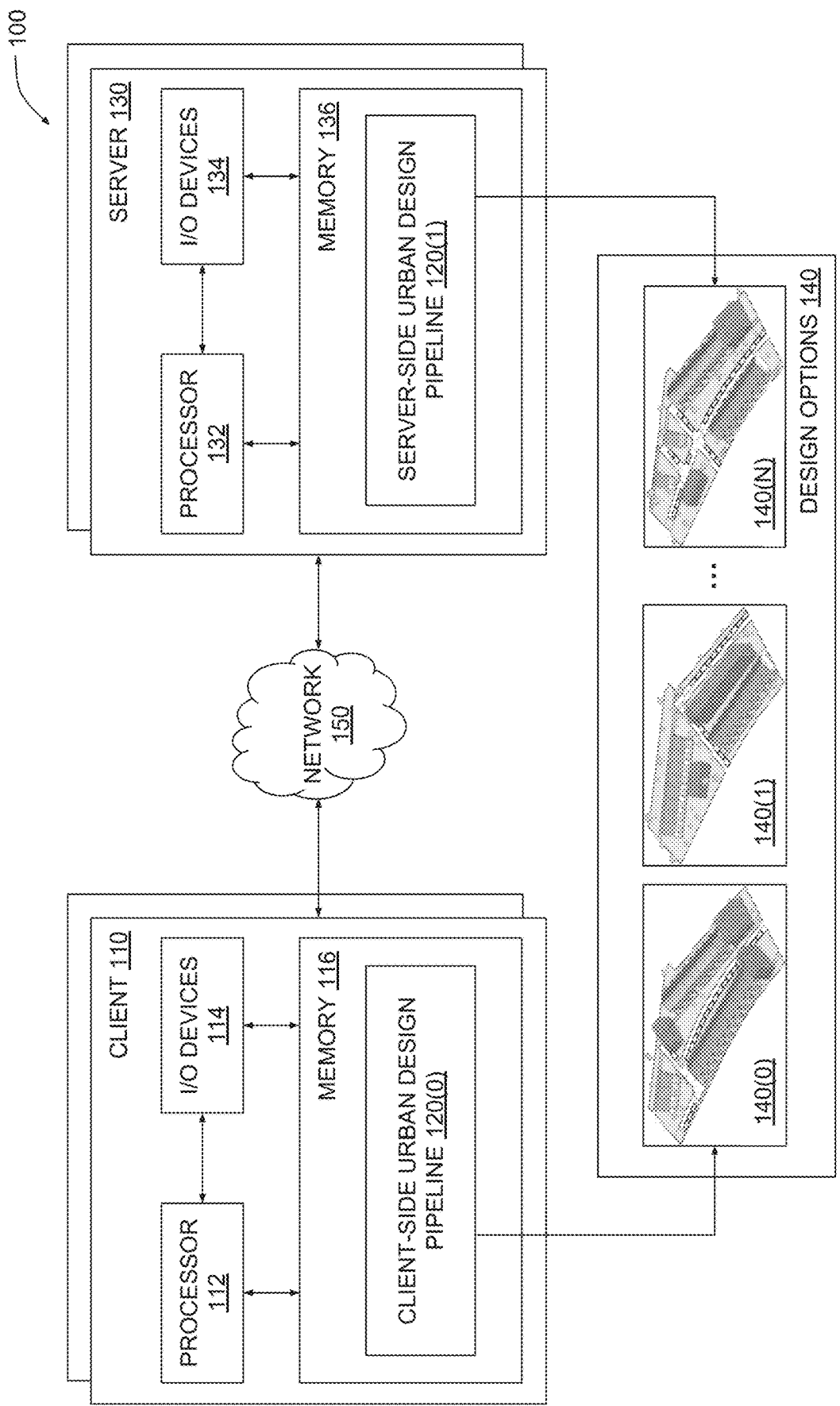
FIG. 1 illustrates a system configured to implement one or more aspects of the present invention.

In the following description, numerous specific details are set forth to provide a more thorough understanding of the various embodiments. However, it will be apparent to one skilled in the art that the inventive concepts may be practiced without one or more of these specific details.

As noted above, urban design projects are typically subject to numerous design criteria and design objectives which complicate the numerous design decisions that designers must make when generating a design. Consequently, designers oftentimes generate designs that do not meet the design criteria very well, do not sufficiently achieve the design objectives, or neglect specific design criteria and/or design objectives altogether. Furthermore, designers lack any techniques for quantifying the degree to which the design criteria and/or design objectives are met, and therefore cannot make data-informed decisions as to which design outperforms any other designs. Finally, a traditional design process lacks repeatability and therefore must begin anew with each new design project.

To address these issues, embodiments of the invention include an urban design pipeline that automatically generates design options for an urban design project. The urban design pipeline includes a geometry engine and an evaluation engine. The geometry engine analyzes design criteria and design objectives associated with the urban design project and then generates numerous candidate designs that meet the design criteria and optimize the design objectives. Each candidate design includes a specific layout of house units, apartment units, and roads configured in a manner that meets the design criteria and achieves the design objectives to a certain degree.

The evaluation engine evaluates each candidate design across a set of metrics to generate a combined metric. The combined metric for a given candidate design indicates the degree to which the candidate design meets the design criteria and optimizes the design objectives. The geometry engine modifies the candidate designs based on corresponding metrics to generate candidate designs that better meet the design criteria and more effectively achieve the design objectives. The geometry engine and evaluation engine operate iteratively in this manner until a convergence criterion is met and a final set of design options is generated. These design options better meet the design criteria and optimize the design objectives relative to the previously generated candidate designs.

At least one technological advantage of the disclosed urban design pipeline is that design options are automatically generated that meet the design criteria and achieve the design objectives associated with an urban design project. Accordingly, a designer can generate designs using the urban design pipeline with minimal risk of generating underperforming designs regardless of the number of design criteria and design objectives involved. Another technological advantage is that the urban design pipeline generates quantifiable metrics which indicate the degree to which the design criteria and design objectives are met, thereby enabling data-informed decisions and recommendations to be made. Yet another technological advantage is that the disclosed urban design pipeline includes repeatable stages that can be easily adapted to other urban design projects with different design criteria and different design objectives. Thus, the process of generating designs can be greatly expedited compared to conventional, manual techniques. These technological advantages represent multiple technological advancements relative to prior art approaches.

System Overview

FIG. 1 illustrates a system configured to implement one or more aspects of the present invention. As shown, a system 100 includes one or more clients 110 and one or more servers 130 configured to interoperate to generate a set of design options 140 for an urban design project. A given client 110 or a given server 130 may be any technically feasible type of computer system, including a desktop computer, a laptop computer, a mobile device, a virtualized instance of a computing device, a distributed and/or cloud-based computer system, and so forth. Clients 110 and servers 130 are coupled together via a network 150. Network 150 may be any technically feasible set of interconnected communication links, including a local area network (LAN), wide area network (WAN), the World Wide Web, or the Internet, among others.

As further shown, a client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes client-side urban design pipeline 120(0). Client-side urban design pipeline 120(0) is a software application that, when executed by processor 112, causes processor 112 to participate in generating design options 140. In doing so, client-side urban design pipeline 120(0) interoperates with a corresponding client-side urban design pipeline 120(1) that resides within server 130, as described in greater detail below.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes server-side urban design pipeline 120(1). Server-side urban design pipeline 120(1) is a software application that, when executed by processor 132, causes processor 132 to participate in generating design options 140. In so doing, server-side urban design pipeline 120(1) interoperates with client-side urban design pipeline 120(0), as mentioned above.

In operation, one or more instances of client-side urban design pipeline 120(0) and one or more instances of server-side urban design pipeline 120(1) interoperate to generate multiple design options 140(0)-140(N). Each design option 140 describes a different development plan for developing a physical property with various structures, roadways, and other fixtures as part of the urban design project, as described in greater detail below in conjunction with FIGS. 2-18. As a general matter, one or more client-side urban design pipelines 120(0) and one or more server-side urban design pipelines 120(1) collectively represent different portions of a distributed software entity. Thus, for simplicity, client-side urban design pipeline 120(0) and server-side urban design pipeline 120(1) will be collectively referred to herein as urban design pipeline 120. Urban design pipeline 120 is described in greater detail below in conjunction with FIG. 2.

Figure 2:
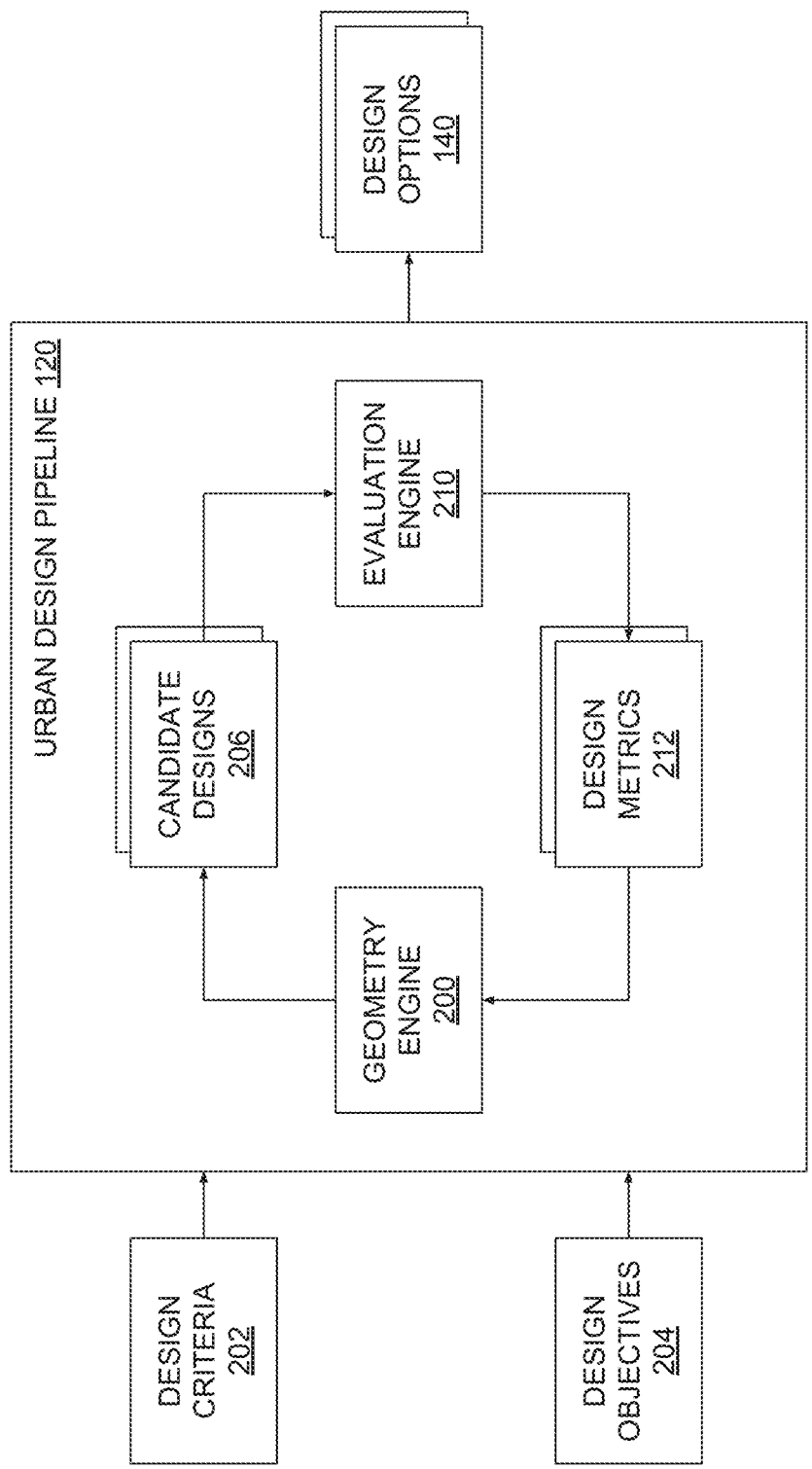
FIG. 2 is a more detailed illustration of the urban design pipeline of FIG. 1, according to various embodiments of the present invention.

FIG. 2 is a more detailed illustration of the urban design pipeline of FIG. 1, according to various embodiments of the present invention. As shown, urban design pipeline 120 includes a geometry engine 200 and an evaluation engine 210. Geometry engine 200 and evaluation engine 210 are configured to perform an iterative process to generate design options 140 based on design criteria 202 and design objectives 204.

Design criteria 202 can include design constraints that generally describe features and/or attributes of designs that should be avoided when generating design options 140. A given design constraint could indicate, for example, regions of the physical property where the construction of structures cannot occur, a maximum number of floors for structures that cannot be exceeded, disallowed placement patterns for roadways, and so forth. Design constraints can be derived from local development regulations and/or building codes as well as directives received from one or more stakeholders in the urban design project.

Design criteria 202 can also include design requirements that generally describe features and/or attributes of designs that should be included within design options 140. A given design requirement could indicate, for example, one or more required orientations for structures, a number of parking lots needed for each structure, a target configuration for roadway intersections, and so forth. Design requirements can be derived from local development regulations and/or building codes as well as directives received from one or more stakeholders in the urban design project.

Design objectives 204 include a set of objective functions to be maximized or minimized when generating design options 140. A given objective function quantifies a specific attribute of a given design. In practice, design objectives 204 include objective functions that quantify solar energy collection, available sight lines associated with windows in structures, the size of yards associated with structures, the variety of neighborhoods, the distribution of programs, total project cost, and total project profit.

In operation, geometry engine 200 receives design criteria 202 and design objectives 204 and generates candidate designs 206 for the urban design project. Each candidate design 206 describes a different development plan for developing the physical property with various structures, roadways, and other fixtures associated with the urban design project. A given candidate design 206 meets some or all design criteria 202 and is therefore generally considered a feasible design. Candidate designs 206 also achieve design objectives 204 to varying degrees. Evaluation engine 210 evaluates each candidate design 206 based on the objective functions included in design objectives 204 to generate design metrics 212. The design metrics 212 generated for a given candidate design 206 quantify the degree to which design objectives 204 are met by the given candidate design 206. In particular, design metrics 212 quantify the solar energy collection, available sight lines, yard size, neighborhood variety, program distribution, total project cost, and total project profit for the given candidate design 206.

Geometry engine 200 analyzes design metrics 212 in conjunction with candidate designs 206 and then regenerates and/or modifies candidate designs 206 to generate improved versions of candidate designs 206 that better achieve design objectives 204 while still meeting design criteria 202. In the manner described, geometry engine 200 and evaluation engine 210 complete one iteration of urban design pipeline 120. In a subsequent iteration, evaluation engine 210 generates design metrics 212 for these improved versions of candidate designs 206, and geometry engine 200 again regenerates and/or modifies candidate designs 206. Geometry engine 200 and evaluation engine 210 iterate in this manner until one or more convergence criteria are met. When the convergence criteria are met, urban design pipeline 120 outputs the final set of candidate designs 206 as design options 140. In one embodiment, geometry engine 200 and evaluation engine 210 execute a multi-objective solver in order to generate and/or update candidate designs 206 until design metrics 212 reach specific threshold values specified in the convergence criteria. The process implemented by urban design pipeline 120 when generating design options 140 is also described below in conjunction with FIG. 3.

Figure 3:
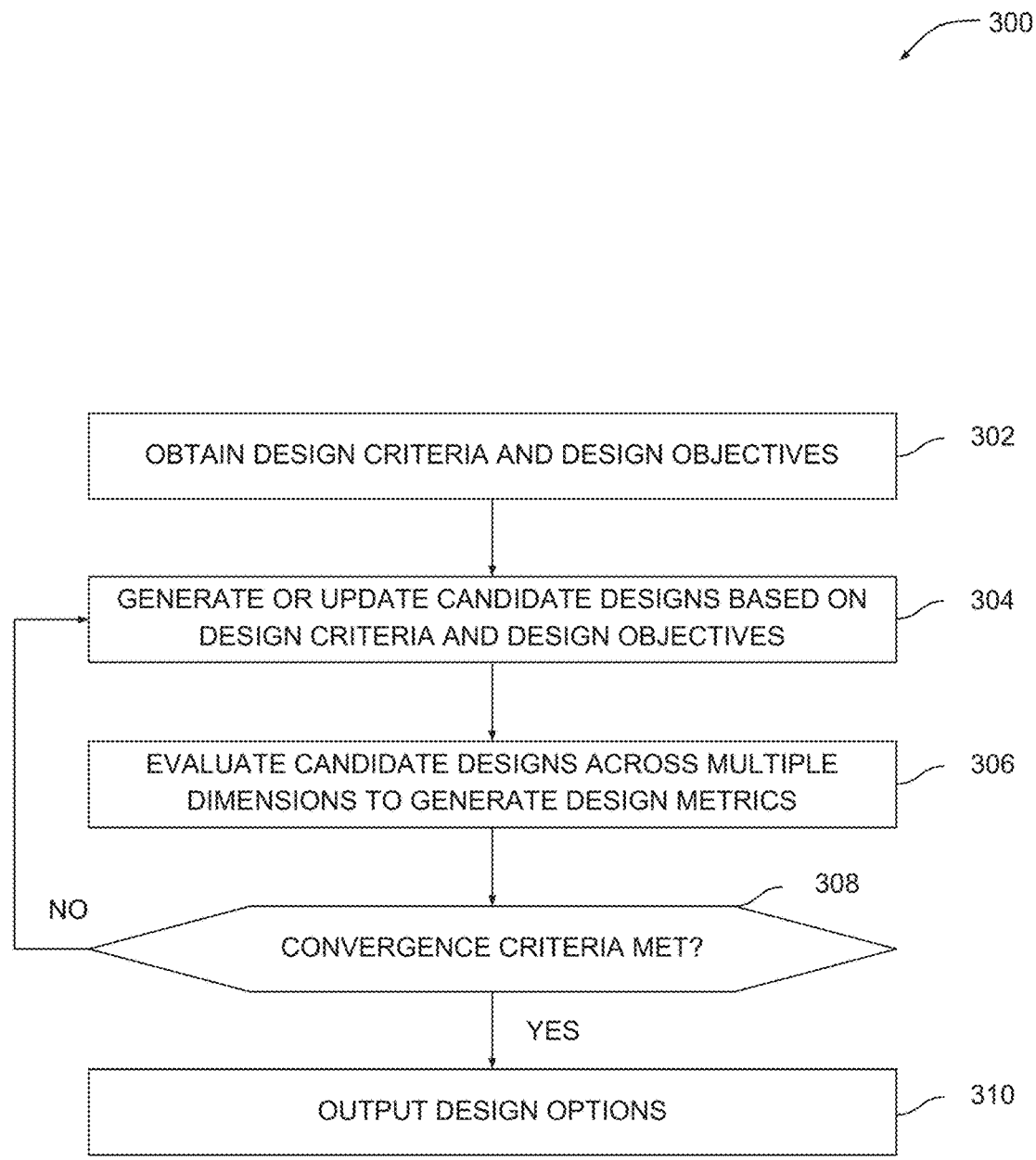
FIG. 3 is a flow diagram of method steps for generating a set of design options for an urban design project, according to various embodiments of the present invention.

FIG. 3 is a flow diagram of method steps for generating a set of design options for an urban design project, according to various embodiments of the present invention. Although the method steps are described in conjunction with the systems of FIGS. 1-2, persons skilled in the art will understand that any system configured to perform the method steps in any order falls within the scope of the present invention.

As shown, a method 300 begins at step 302, where geometry engine 200 obtains design criteria 202 and design objectives 204. Design criteria 202 can include design constraints that describe features and/or attributes of designs that should be avoided when generating design options 140. Design criteria 202 can also include design requirements that describe features and/or attributes of designs that should be included within design options 140. Design objectives 204 include a set of objective functions that should be maximized or minimized when generating design options 140.

At step 304, geometry engine 200 generates or updates candidate designs 206 based on design criteria 202 and design objectives 204. A given candidate design 206 describes a different development plan for developing the physical property. Each candidate design 206 generated by geometry engine 210 meets design criteria 202 and is therefore considered a feasible design, and also achieves design objectives 204 to some degree. Geometry engine 200 is described in greater detail below in conjunction with FIGS. 4-9.

At step 306, evaluation engine 210 evaluates candidate designs 206 across multiple dimensions to generate design metrics 212. In practice, evaluation engine 210 generates design metrics 212 that quantify the solar energy collection, available sight lines, yard size, neighborhood variety, program distribution, total project cost, and total project profit for each candidate design 206. Evaluation engine 210 is described in greater detail below in conjunction with FIGS. 10-18.

At step 308, geometry engine 200 and/or evaluation engine 210 determine whether one or more convergence criteria are met. In one embodiment, geometry engine 200 and/or evaluation engine 210 determine whether design metrics 212 generated for candidate designs 206 meet or exceed minimum threshold levels. If the convergence criteria are not met, then the method 300 returns to step 304 and another iteration is performed. Otherwise, the method 300 proceeds to step 310.

At step 310, urban design pipeline 120 outputs design options 140. Each design option 140 meets design criteria 202 and also achieves design objectives 204 to an optimal extent compared to candidate designs 206 generated and evaluated during previous iterations. A given design option 140 describes a specific development plan for developing the physical property with various structures, roadways, and other fixtures related to the urban design project, as also described in greater detail below in conjunction with FIGS. 4-9.

Via the method 300 described above, urban design pipeline 120 automatically generates feasible design options for an urban design project that satisfy provided design criteria and optimize provided design objectives. Accordingly, the designer need not manually or mentally keep track of these design criteria and design objectives when generating designs. Further, urban design pipeline 120 can quantify the degree to which the design objectives are achieved, thereby providing hard data based on which a specific design options can be selected. Finally, urban design pipeline 120 can be repeatedly applied to different urban design projects by updating the design criteria and design objectives, greatly expediting the process of generating designs for urban design projects.

Geometry Engine

As discussed above in conjunction with FIGS. 1-3, urban design pipeline 120 implements geometry engine 200 to generate geometry associated with candidate designs 206. As described herein, "geometry" associated with a given design generally refers to the topological layout of various elements associated with an urban design project, including house units, roadways, parkland, and so forth. In one embodiment, geometry engine 200 generates geometry for a given candidate design 206 based on a set of construction parameters that can vary between different candidate designs 206. Geometry engine 200 performs a multistep process to generate the geometry for each candidate design 206, as described by way of example below in conjunction with FIGS. 4-8.

Figure 4:
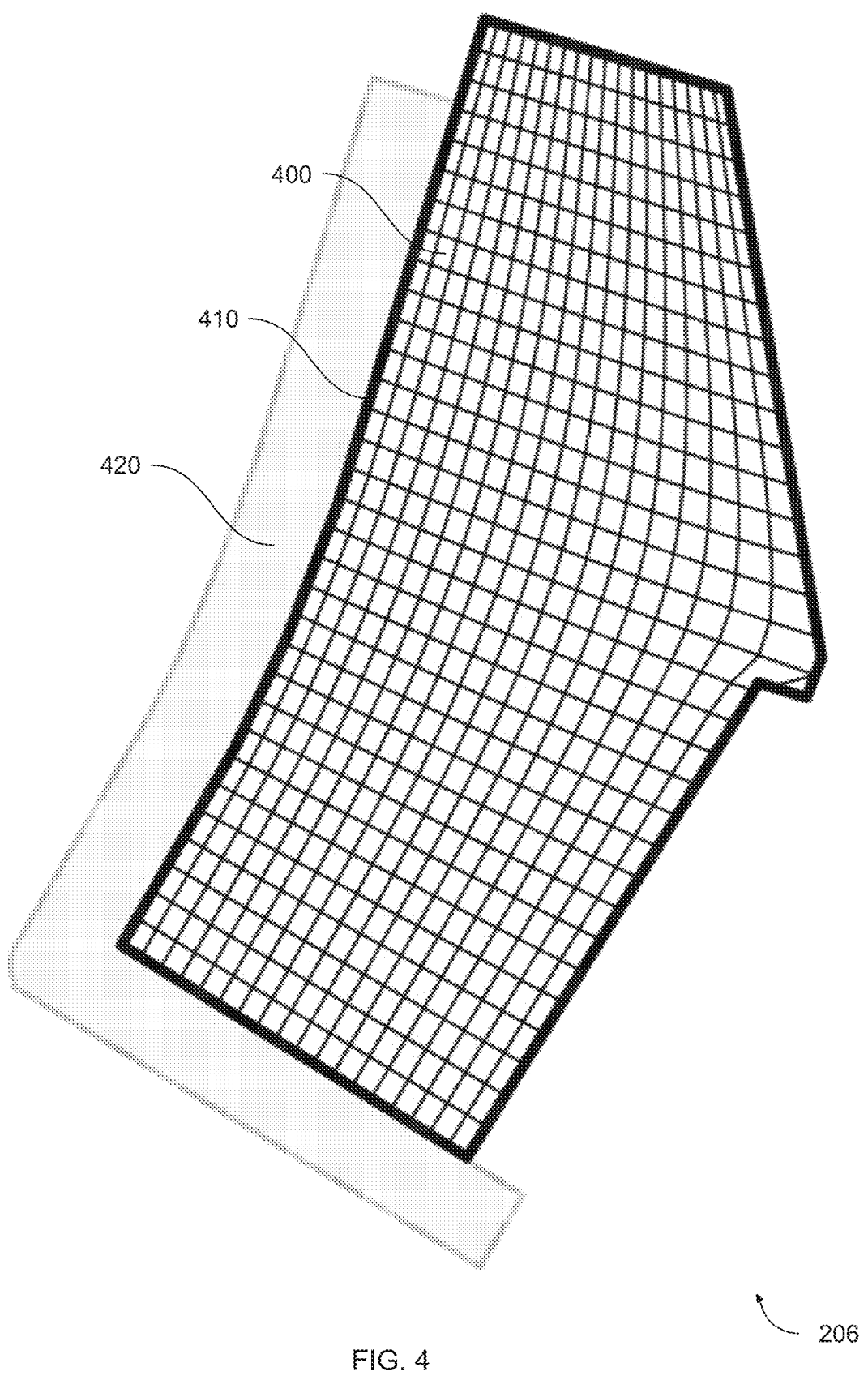
FIG. 4 illustrates how the geometry engine of FIG. 2 generates a geometrical mesh for a candidate design, according to various embodiments of the present invention.

FIG. 4 illustrates how the geometry engine of FIG. 2 generates a geometrical mesh for a candidate design, according to various embodiments of the present invention. As shown, geometry engine 200 generates an initial mesh 400 based on a perimeter 410. Perimeter 410 corresponds to a property line and resides adjacent to a buffer zone 420 where geometry engine 200 cannot generate geometry. Perimeter 410 is defined within design criteria 202 as a design constraint that constrains geometry engine 200 to generating geometry only within the boundaries of perimeter 410. Geometry engine 200 generates initial mesh 400 by projecting a number of longitudinal lines lengthwise between the top and bottom edges of perimeter 410 and projecting a number of latitudinal lines widthwise between the left and right edges of perimeter 410, thereby forming a mesh of polygons.

Figure 5:
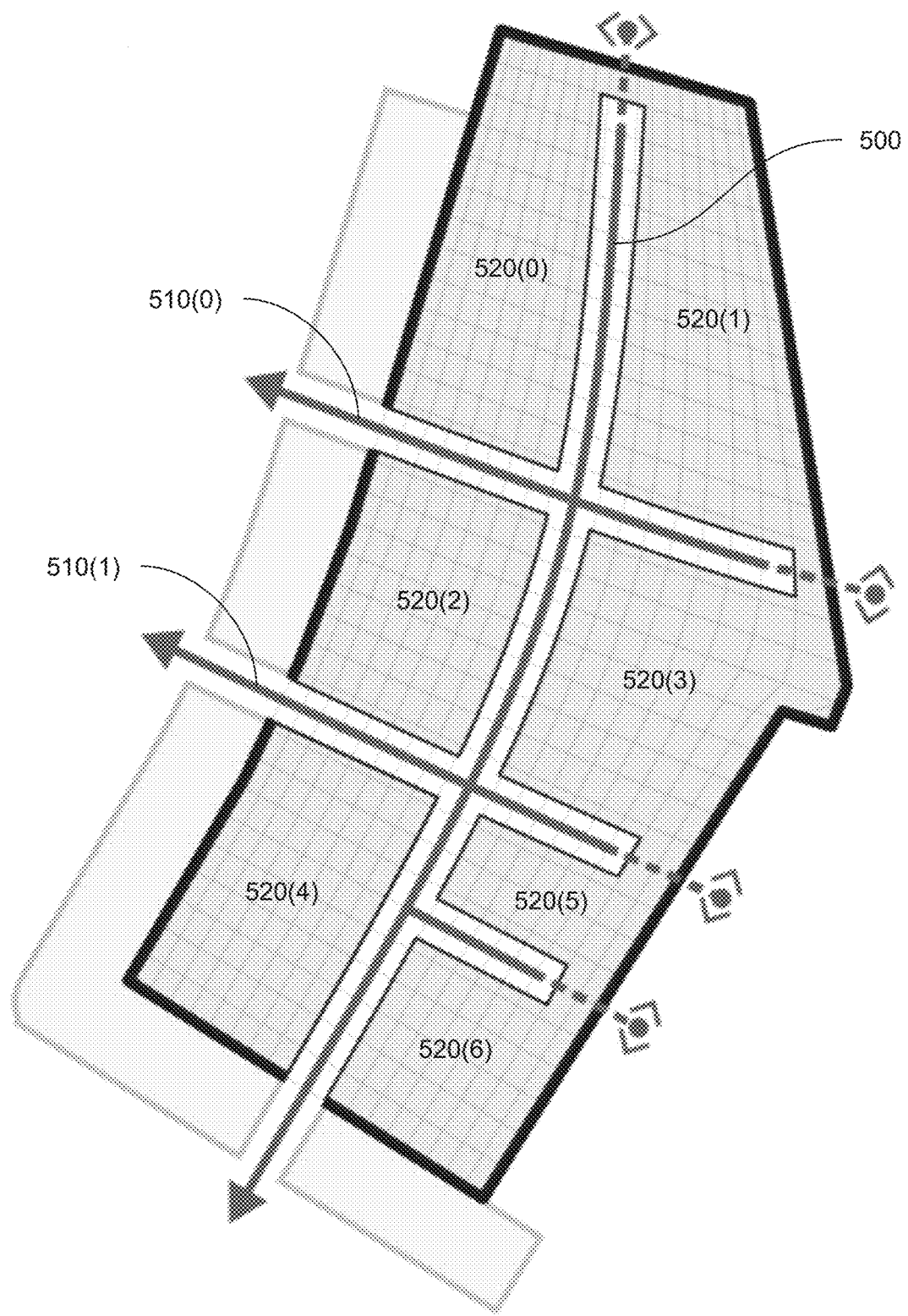
FIG. 5 illustrates how the geometry engine of FIG. 2 generates neighborhood subdivisions for a candidate design, according to various embodiments of the present invention.

FIG. 5 illustrates how the geometry engine of FIG. 2 generates neighborhood subdivisions for a candidate design, according to various embodiments of the present invention. As shown, geometry engine 200 subdivides initial mesh 400 by selecting one or more longitudinal lines 500 and one or more latitudinal lines 510 to produce neighborhood subdivisions 520. Longitudinal lines 500 selected in this manner provide roadways that traverse initial mesh 400 lengthwise and are referred to herein as "avenues." Latitudinal lines 510 selected in this manner provide roadways that traverse initial mesh 400 widthwise and are referred to herein as "streets." In one embodiment, geometry engine 200 may select one or more longitudinal lines 500 and one or more latitudinal lines 510 based on a set of construction parameters.

Figure 6:
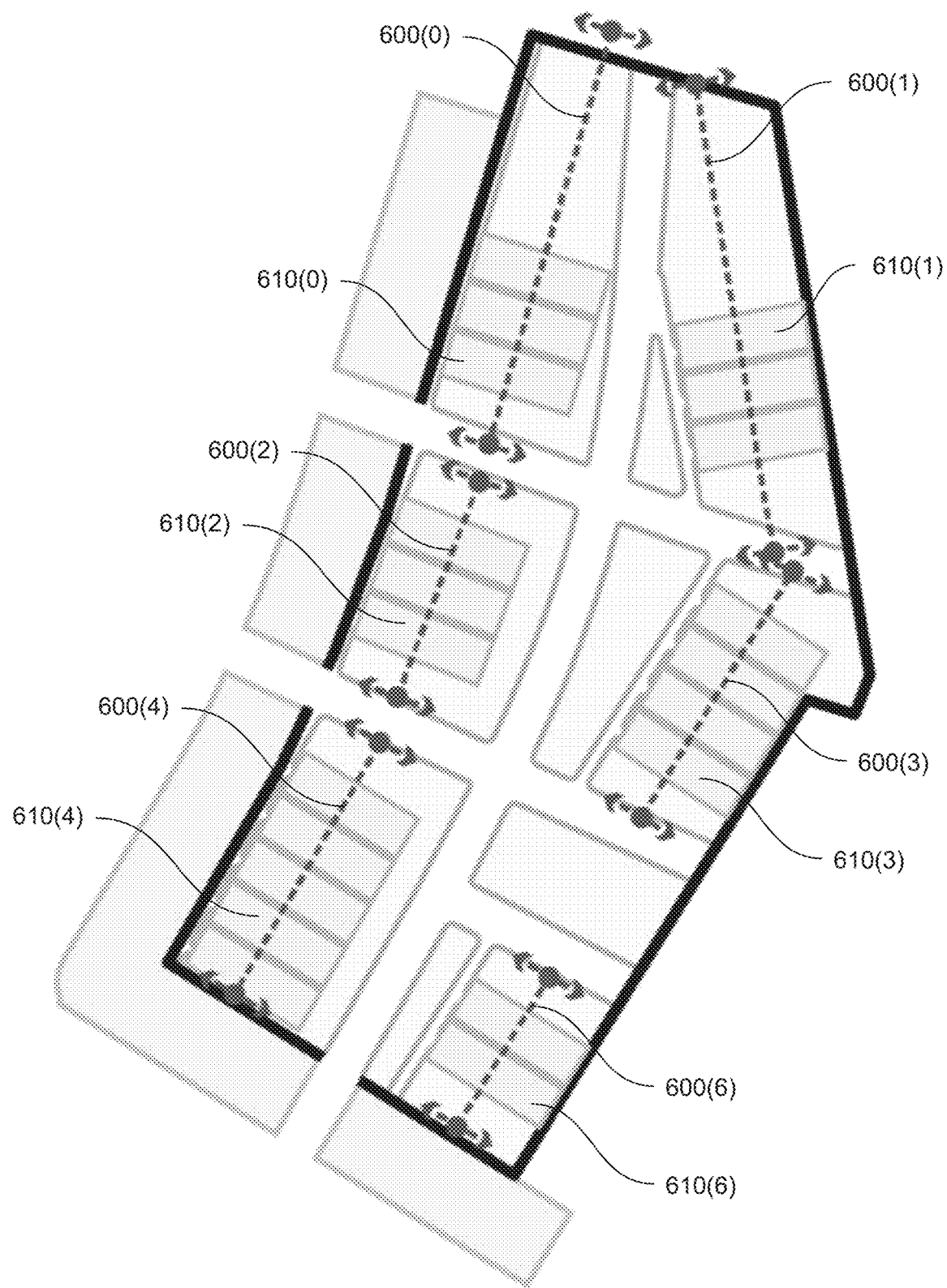
FIG. 6 illustrates how the geometry engine of FIG. 2 places house units within a candidate design, according to various embodiments of the present invention.

FIG. 6 illustrates how the geometry engine of FIG. 2 places house units within a candidate design, according to various embodiments of the present invention. As shown, geometry engine 200 populates neighborhood subdivisions 520 of FIG. 5 by placing centerlines 600 that traverse lengthwise across neighborhood subdivisions 520 and then placing house units 610 along those centerlines. In the example shown, geometry engine 200 excludes neighborhood 520(5) from this process because this particular neighborhood subdivision is too small to include house units. In one embodiment, geometry engine 200 may determine the placement and orientation of house units 610 based on a set of construction parameters.

Figure 7:
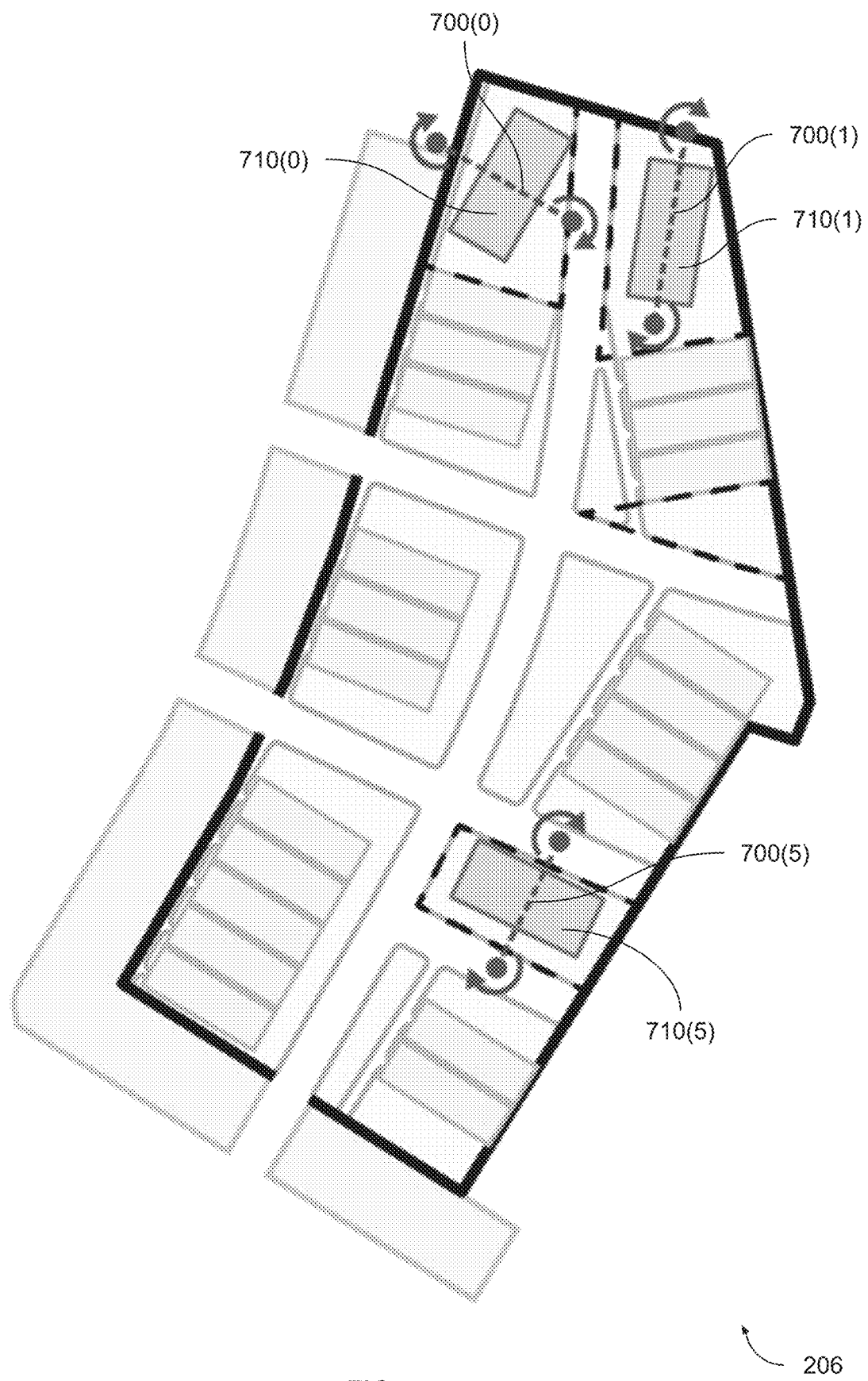
FIG. 7 illustrates how the geometry engine of FIG. 2 places apartment units within a candidate design, according to various embodiments of the present invention.

FIG. 7 illustrates how the geometry engine of FIG. 2 places apartment units within a candidate design, according to various embodiments of the present invention. As shown, geometry engine 200 populates neighborhood subdivisions 520 of FIG. 5 by placing centerlines 700 that traverse lengthwise across portions of specific neighborhood subdivisions 520 that do not include house units 610. Geometry engine 200 then places apartment units 710 along these centerlines 700. In one embodiment, geometry engine 200 may determine the placement and orientation of apartment units 710 based on a set of construction parameters.

Figure 8:
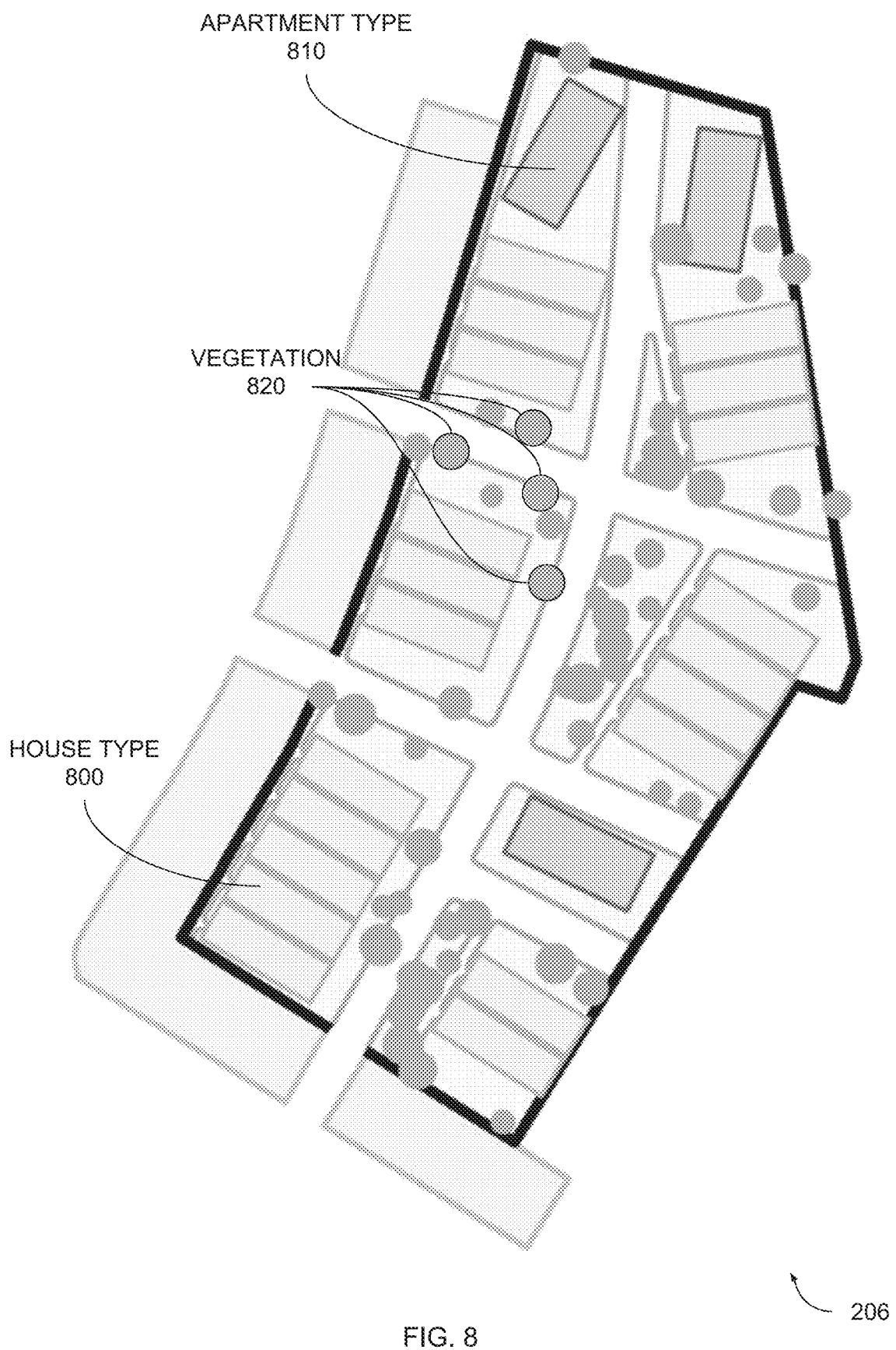
FIG. 8 illustrates how the geometry engine of FIG. 2 assigns program types to house units and apartment units within a candidate design, according to various embodiments of the present invention.

FIG. 8 illustrates how the geometry engine of FIG. 2 assigns program types to house units and apartment units within a candidate design, according to various embodiments of the present invention. As shown, geometry engine assigns a house type 800 to an exemplary house unit and assigns an apartment type 810 to an exemplary apartment unit. The available house types and apartment types are generally referred to herein as "program" types. The available program types are specified in design criteria 202. For example, a given program type could be "3-story house" or "5-story apartment complex," among others. Design criteria 202 can also indicate a minimum number of each program type to be included in any given candidate design 206. In one embodiment, geometry engine 200 determines the distribution of program types based on a set of construction parameters. Geometry engine 210 incorporates vegetation 820 into remaining areas that are not populated with roadways, houses, apartments, or other elements.

Referring generally to FIGS. 4-8, geometry engine 200 performs the above-described operations to generate a given candidate design included in candidate designs 206. Geometry engine 200 is configured to perform similar operations numerous times with different sets of input parameters in order to generate a spectrum of different candidate designs 206. The input parameters control the placement of roadways, house units, apartment units, and other attributes that can vary between different candidate designs 206. The various operations performed by geometry engine 200 are described in greater detail below in conjunction with FIG. 9.

Figure 9:
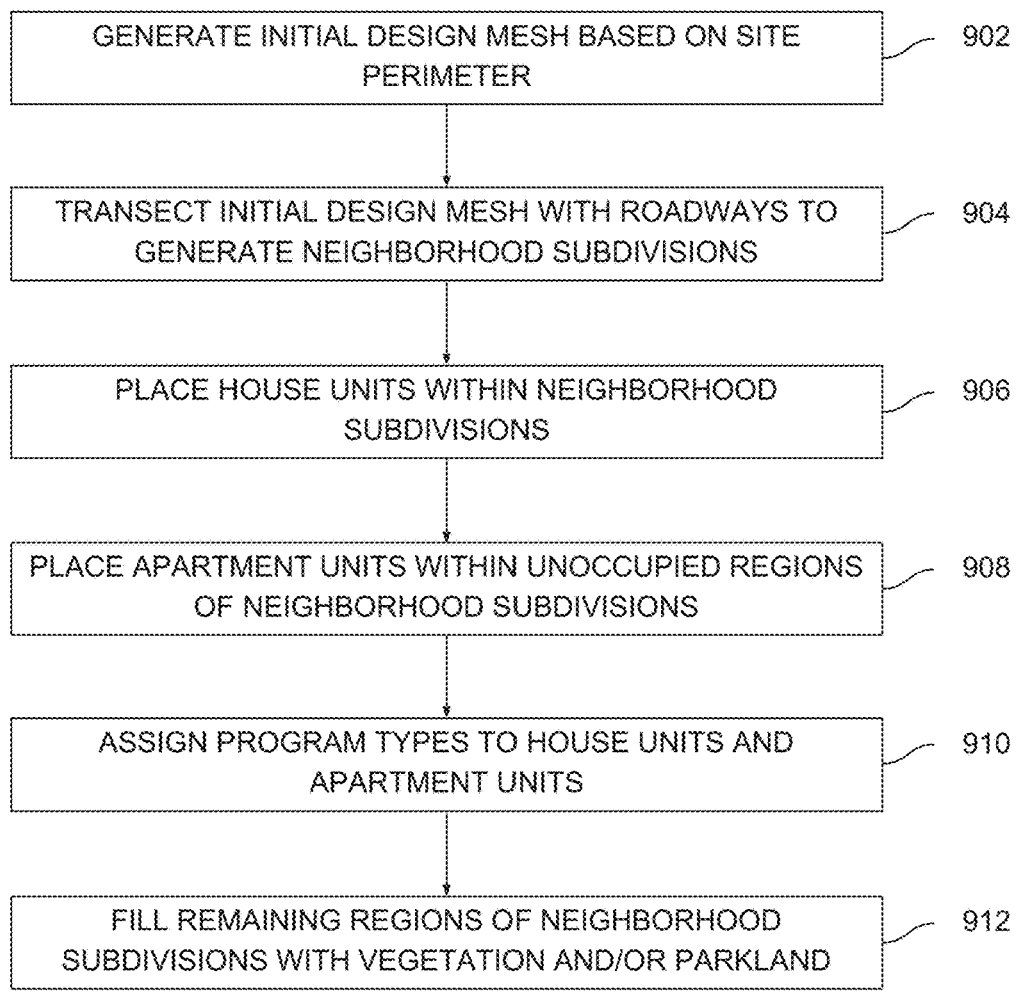
FIG. 9 is a flow diagram of method steps for generating a candidate design for an urban design project, according to various embodiments of the present invention.

FIG. 9 is a flow diagram of method steps for generating a candidate design for an urban design project, according to various embodiments of the present invention. Although the method steps are described in conjunction with the systems of FIGS. 1-8, persons skilled in the art will understand that any system configured to perform the method steps in any order falls within the scope of the present invention.

As shown, a method 900 begins at step 902, where geometry engine 200 generates an initial design mesh based on a site perimeter. The site perimeter may correspond to a property line. Geometry engine 200 generates initial mesh 400 by projecting a number of longitudinal lines lengthwise between edges of the perimeter and projecting a number of latitudinal lines widthwise between edges of the perimeter, as described above in conjunction with FIG. 4.

At step 904, geometry engine 200 transects the initial design mesh generated at step 902 with roadways to generate neighborhoods. In doing so, geometry engine 200 selects one or more of the longitudinal lines and one or more of the latitudinal lines generated at step 902 as roadways that traverse the initial mesh, as described above in conjunction with FIG. 5.

At step 906, geometry engine 200 places house units within the neighborhood subdivisions generated at step 904. Geometry engine 200 generates a centerline within some or all neighborhood subdivisions and then places one or more house units along each centerline, as described above in conjunction with FIG. 6. In one embodiment, geometry engine 200 may not place house units in neighborhood subdivisions unless those subdivisions have at least a minimum size.

At step 908, geometry engine 200 places apartment units within unoccupied regions of the neighborhood subdivisions previously generated at step 904 and at least partially populated with house units at step 906. Geometry engine 200 performs step 908 relative to remaining space within neighborhood subdivisions that are not already occupied by house units. An example of how geometry engine 200 performs step 908 is described above in conjunction with FIG. 7.

At step 910, geometry engine 200 assigns program types to the house units generated and placed at step 906 and the apartment units generated and placed at step 908. Geometry engine 200 performs step 910 based on design criteria 202, which indicate available housing types and apartment types and minimum numbers of each type that should be included in any given candidate design 206.

At step 912, geometry engine 200 fills in remaining regions of neighborhood subdivisions with vegetation and/or parkland. FIG. 8 sets forth an example of how geometry engine 200 could perform steps 910 and 912.

Geometry engine 200 repeats the method 900 to generate each candidate design 206. In one embodiment, geometry engine 200 may perform the method 900 with many different sets of construction parameters in order to generate many different candidate designs 206, thereby performing a generative design process. Evaluation engine 210 analyzes each candidate design 206 to generate design metrics 212, as described in greater detail below in conjunction with FIGS. 10-18.

Evaluation Engine

Urban design pipeline 120 implements evaluation engine 210 to analyze candidate designs 206 across several different metrics. Those metrics quantify the solar energy collection, available sight lines, yard size, neighborhood variety, program distribution, total project cost, and total project profit for any given candidate design 206. Evaluation engine 210 computes values for each of these different metrics for each candidate design 206 to generate design metrics 212. FIGS. 10-16 illustrate by way of example how evaluation engine 210 generates design metrics 212 for an exemplary candidate design 206.

Figure 10:
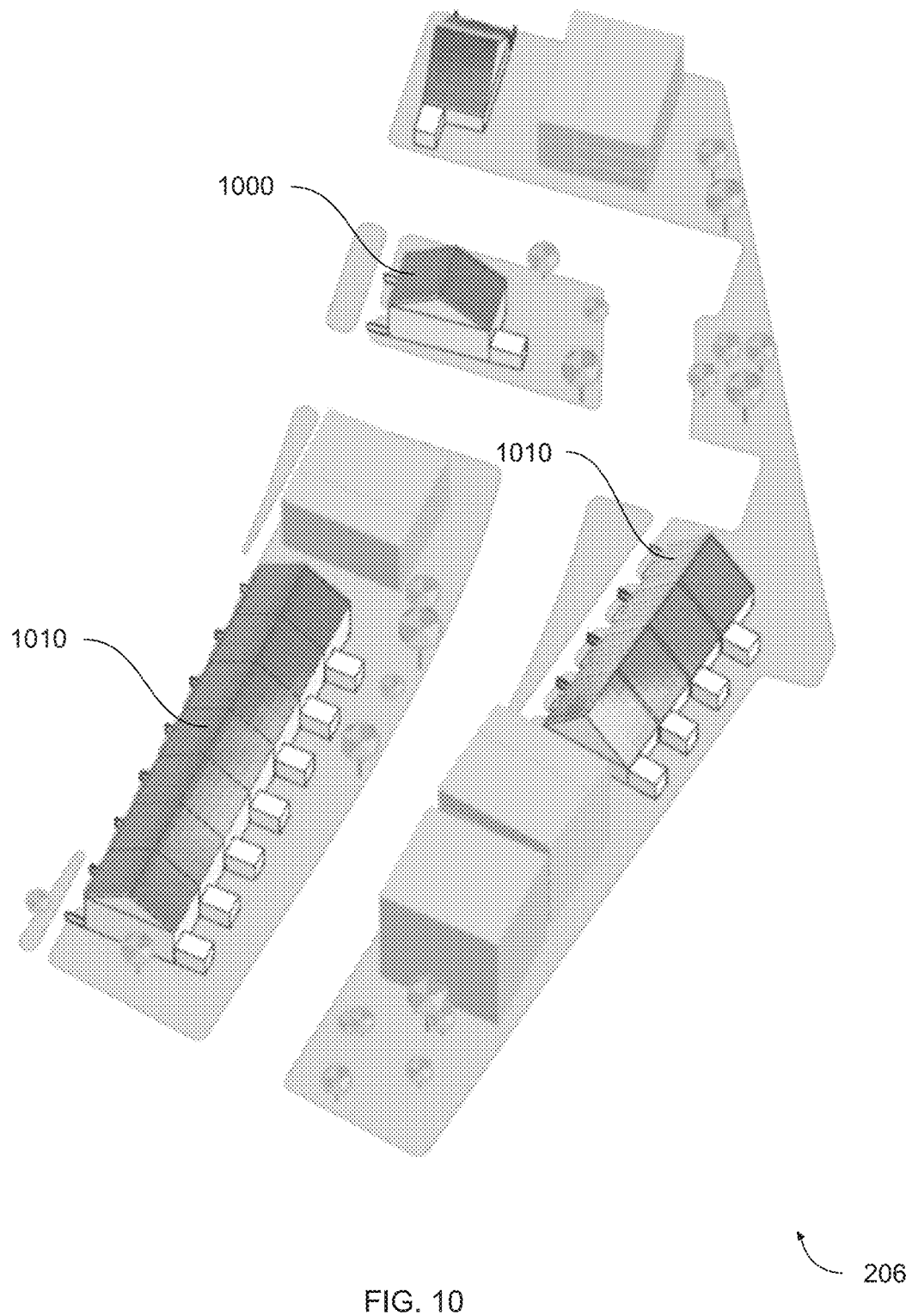
FIG. 10 illustrates how the evaluation engine of FIG. 2 generates a solar metric for a candidate design, according to various embodiments of the present invention.

FIG. 10 illustrates how the evaluation engine of FIG. 2 generates a solar metric for a candidate design, according to various embodiments of the present invention. As shown, evaluation engine 210 estimates the solar gain across the roof surfaces of all house units included in candidate design 206. Solar gain generally refers to the amount of solar energy collected at a given roof surface. Some roof surfaces provide greater solar gain than others. For example, the roof surface of house unit 1000 provides high solar gain, the roof surface of house unit 1010 provides medium solar gain, and the roof surface of house unit 1020 provides low solar gain. In one embodiment, evaluation engine 210 generates an estimate of the solar gain for a given roof surface based on a ratio between the number of non-occluded sampled sun rays and the number of available sampled sun rays. Evaluation engine 210 computes the total solar gain for candidate design 206 to generate the solar metric.

Figure 11:
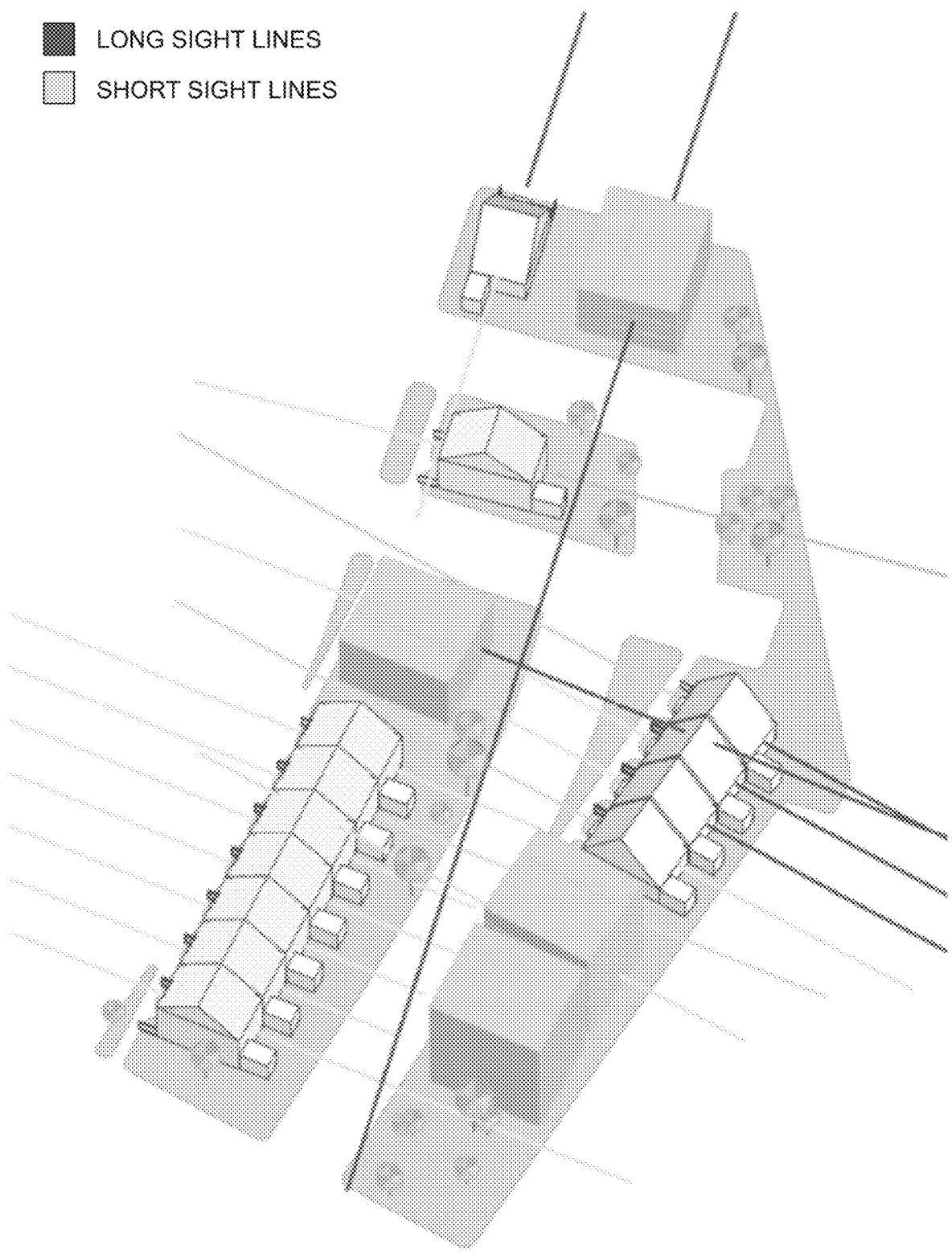
FIG. 11 illustrates how the evaluation engine of FIG. 2 generates a view metric for a candidate design, according to various embodiments of the present invention.

FIG. 11 illustrates how the evaluation engine of FIG. 2 generates a view metric for a candidate design, according to various embodiments of the present invention. As shown, evaluation engine 210 generates multiple sight lines that emanate from house units and apartment units included in candidate design 206. Some sight lines intersect nearby obstacles and are considered obstructed sight lines. Obstructed sight lines are typically somewhat short. Other sight lines do not intersect nearby obstacles and are considered unobstructed sight lines. Unobstructed sight lines are relatively longer than obstructed site lines. For a given housing or apartment unit, evaluation engine 210 determines a normalized sight line length. Evaluation engine 210 averages the normalized sight line length to generate the view metric.

Figure 12:
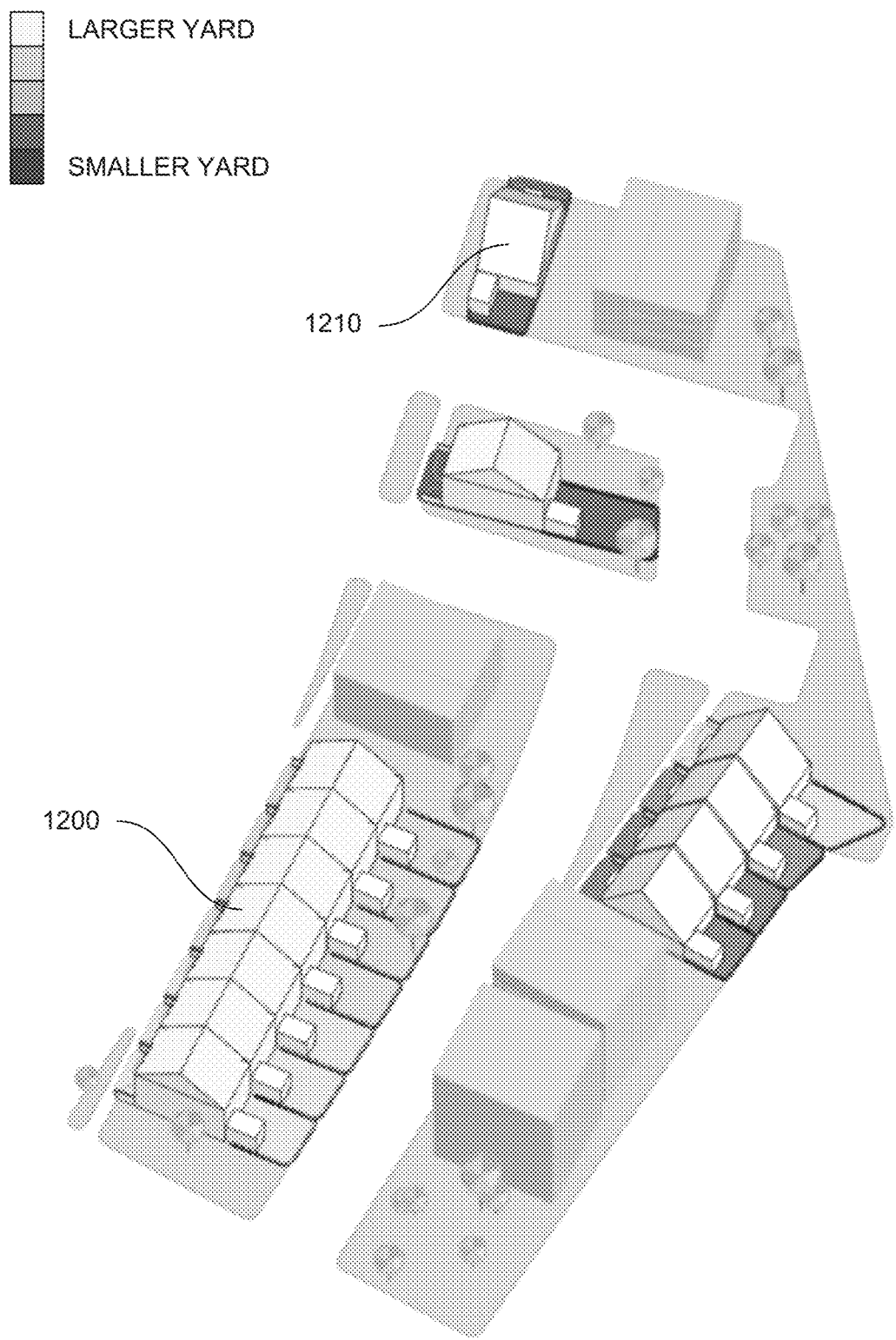
FIG. 12 illustrates how the evaluation engine of FIG. 2 generates a yard size metric for a candidate design, according to various embodiments of the present invention.

FIG. 12 illustrates how the evaluation engine of FIG. 2 generates a yard size metric for a candidate design, according to various embodiments of the present invention. As shown, evaluation engine 210 determines the yard size for each house unit within candidate design. Some house units have a larger yard, while others have a smaller yard. For example, house unit 1200 has a rather large yard, while house unit 1210 has a yard that is quite small. Evaluation engine 210 computes the average yard size across all house units within candidate design 206 to generate the yard metric.

Figure 13:
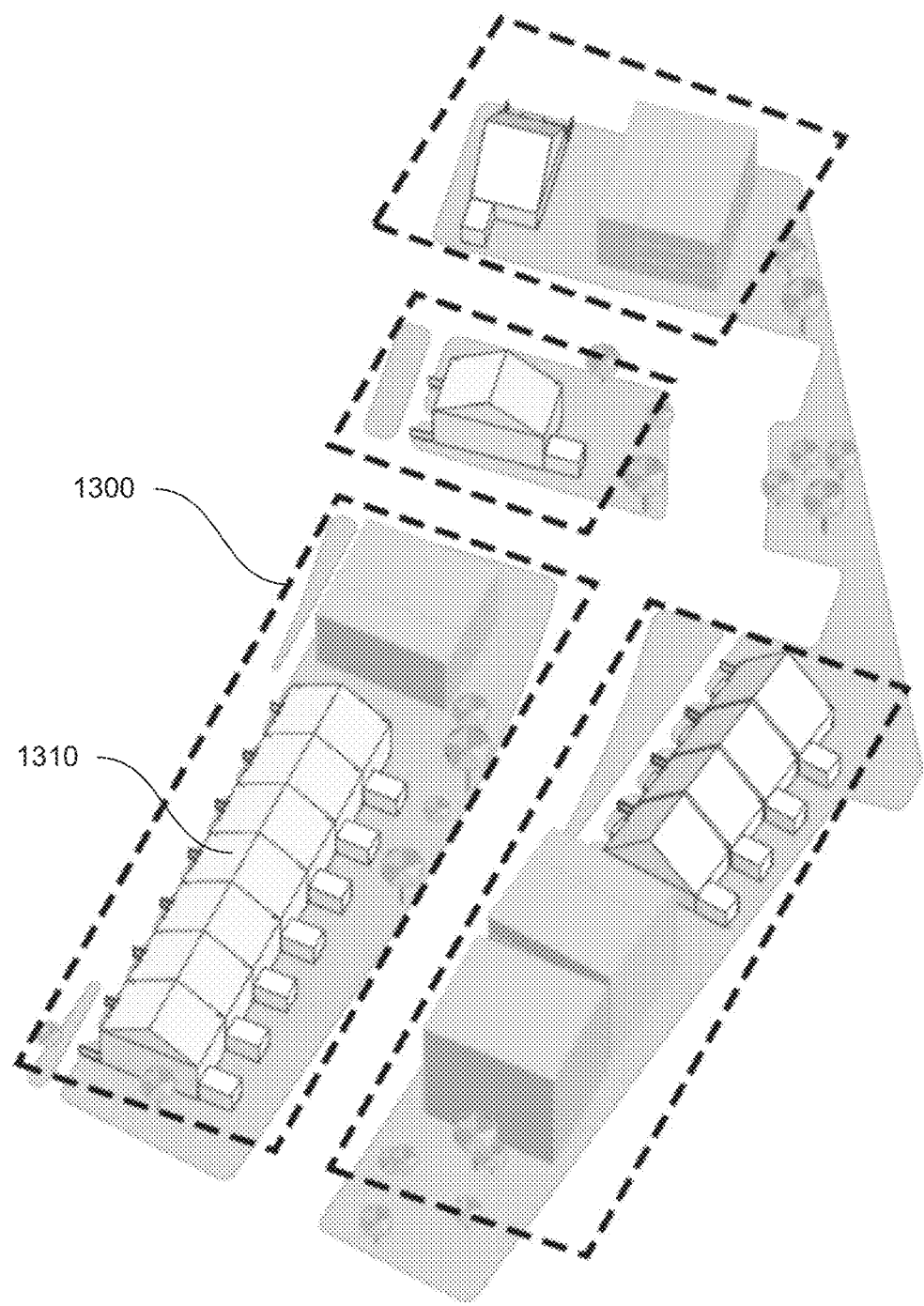
FIG. 13 illustrates how the evaluation engine of FIG. 2 generates a variety metric for a candidate design, according to various embodiments of the present invention.

FIG. 13 illustrates how the evaluation engine of FIG. 2 generates a variety metric for a candidate design, according to various embodiments of the present invention. As shown, evaluation engine 210 generates groupings of house units for each neighborhood and then determines that neighborhood 1300, which includes house units 1310, includes the most house units. The number of house units within the largest neighborhood generally indicates the level of variety to be expected in the layout of neighborhoods included in candidate design 206. In particular, candidate designs with many smaller neighborhoods tend to have more varied neighborhood layouts compared to candidate designs with several very large neighborhoods, which usually have long rows of house units. Long rows of houses are generally undesirable in design candidates. Evaluation engine 210 generates the variety metric based on the number of houses included in the largest neighborhood.

Figure 14:
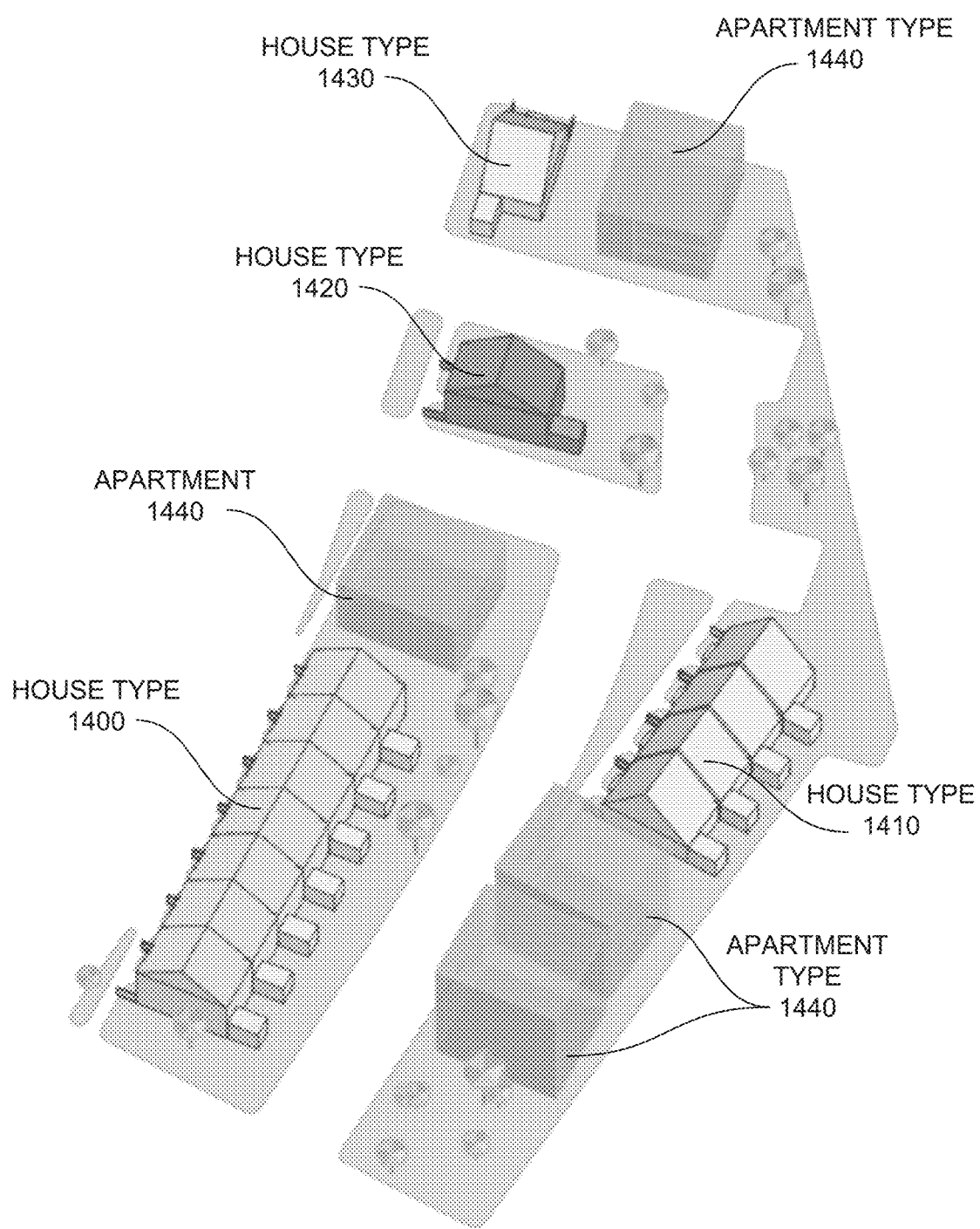
FIG. 14 illustrates how the evaluation engine of FIG. 2 generates a program metric for a candidate design, according to various embodiments of the present invention.

FIG. 14 illustrates how the evaluation engine of FIG. 2 generates a program metric for a candidate design, according to various embodiments of the present invention. As shown, evaluation engine 210 tabulates the different types of program types, including house types and apartment types, in order to determine how closely the number of program types matches the distribution of program types specified in design criteria 202. Candidate design 206 includes several different program types, including house type 1400, 1410, 1420, and 1430, as well as apartment type 1440. As mentioned, design criteria 202 includes the available program types as well as minimum numbers of each type of unit to be included in candidate designs 206. Evaluation engine 206 generates the program metric to reflect how closely candidate design 206 matches the distribution of program types specified in design criteria 202. In one embodiment, the program metric indicates a difference between a number of program types specified in design criteria 202 and an actual number of corresponding program types included in candidate design 206.

Figure 15:
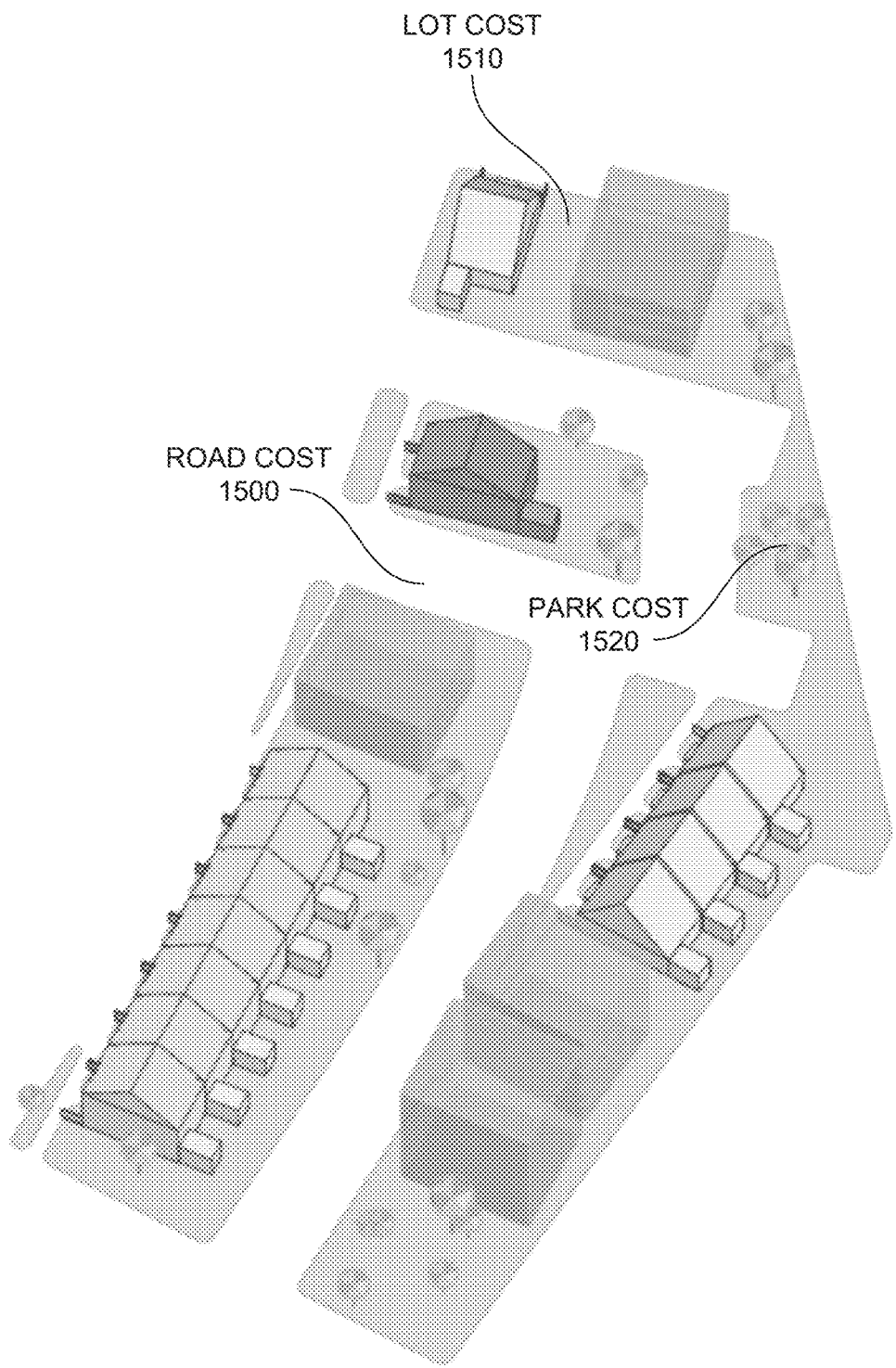
FIG. 15 illustrates how the evaluation engine of FIG. 2 generates a cost metric for a candidate design, according to various embodiments of the present invention.

FIG. 15 illustrates how the evaluation engine of FIG. 2 generates a cost metric for a candidate design, according to various embodiments of the present invention. As shown, evaluation engine 210 determines a variety of costs associated with the development of various fixtures included in candidate design 206, including road cost 1500, lot cost 1510, and park cost 1520. For a given type of fixture, evaluation engine 210 computes the total number of units, total area, or total linear measure for each instance of the type of fixture. Evaluation engine 210 also determines the per unit, per area, or per linear unit costs for constructing the given type of fixture. Based on this information, evaluation engine 210 determines the total cost of constructing each instance of the fixture. For example, evaluation engine 210 could measure the total area of parkland and then multiply that area by the cost per unit area of constructing parkland to generate park cost 1520. Based on the total costs aggregated across all fixtures, evaluation engine 210 generates the cost metric.

Figure 16:
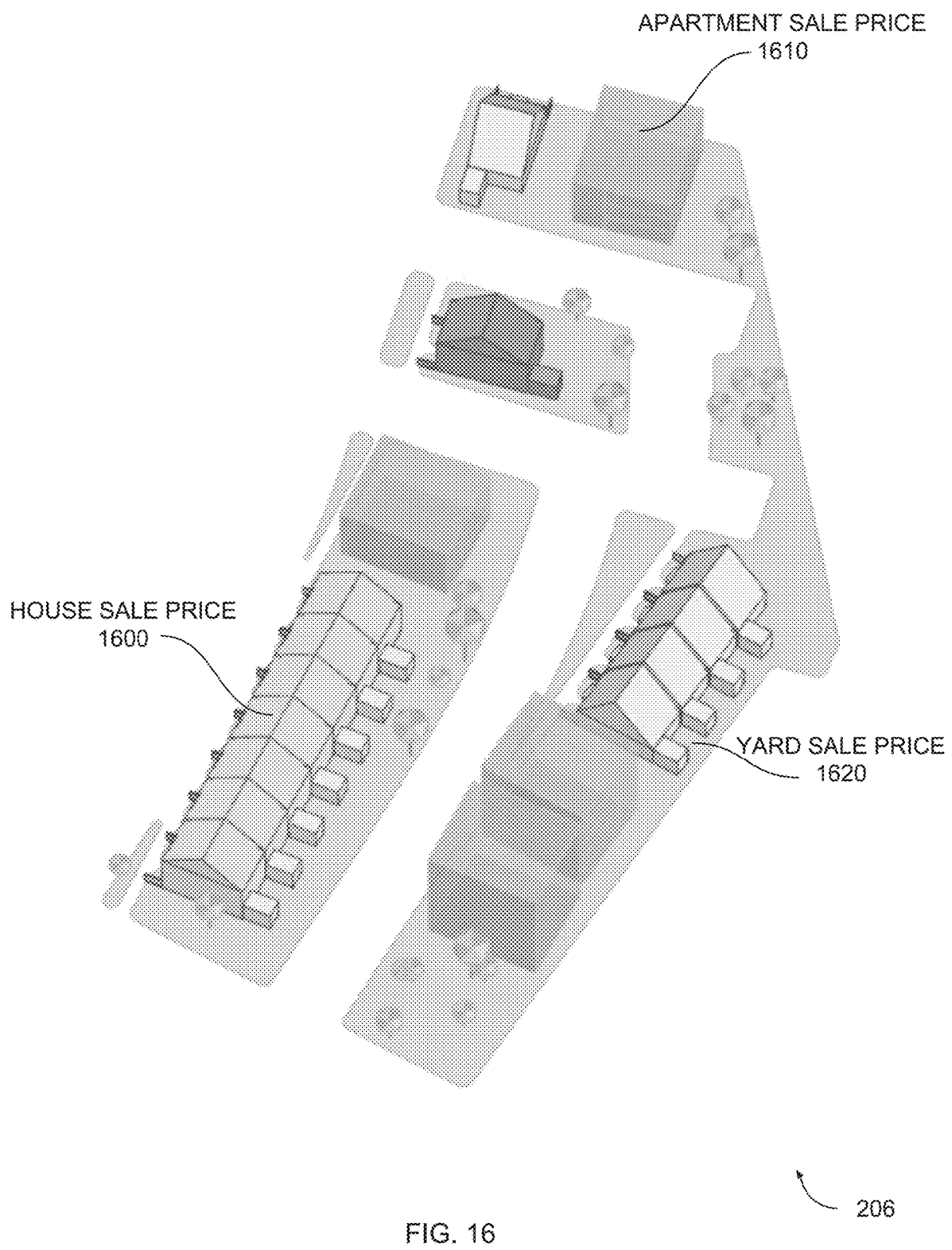
FIG. 16 illustrates how the evaluation engine of FIG. 2 generates a profit metric for a candidate design, according to various embodiments of the present invention.

FIG. 16 illustrates how the evaluation engine of FIG. 2 generates a profit metric for a candidate design, according to various embodiments of the present invention. As shown, evaluation engine 210 determines a variety of revenue sources associated with the sale of portions of candidate design 206. These revenue sources are represented by various sale prices associated with fixtures included in candidate design 206, including house sale price 1600, apartment sale price 1610, and yard sale price 1620. For a given type of fixture, evaluation engine 210 computes the sale price of the type of fixture and then multiplies this number by the number of instances of that type of fixture to determine the total revenue that can be generated via the sale of those instances. For example, evaluation engine 210 could multiply house sale price 1600 by the number of houses included in candidate design 206 to arrive at the total revenue derived from selling each house included in candidate design 206. Evaluation engine 210 aggregates the total revenue across all fixtures and then subtracts the various costs computed when generating the cost metric to produce the profit metric. In one embodiment, the sale price for a given fixture may quantify the degree to which the fixture increases the sale price of another fixture. For example, yard sale price 1620 could represent the degree to which the sale price of a corresponding house is increased by the associated yard.

Figure 17:
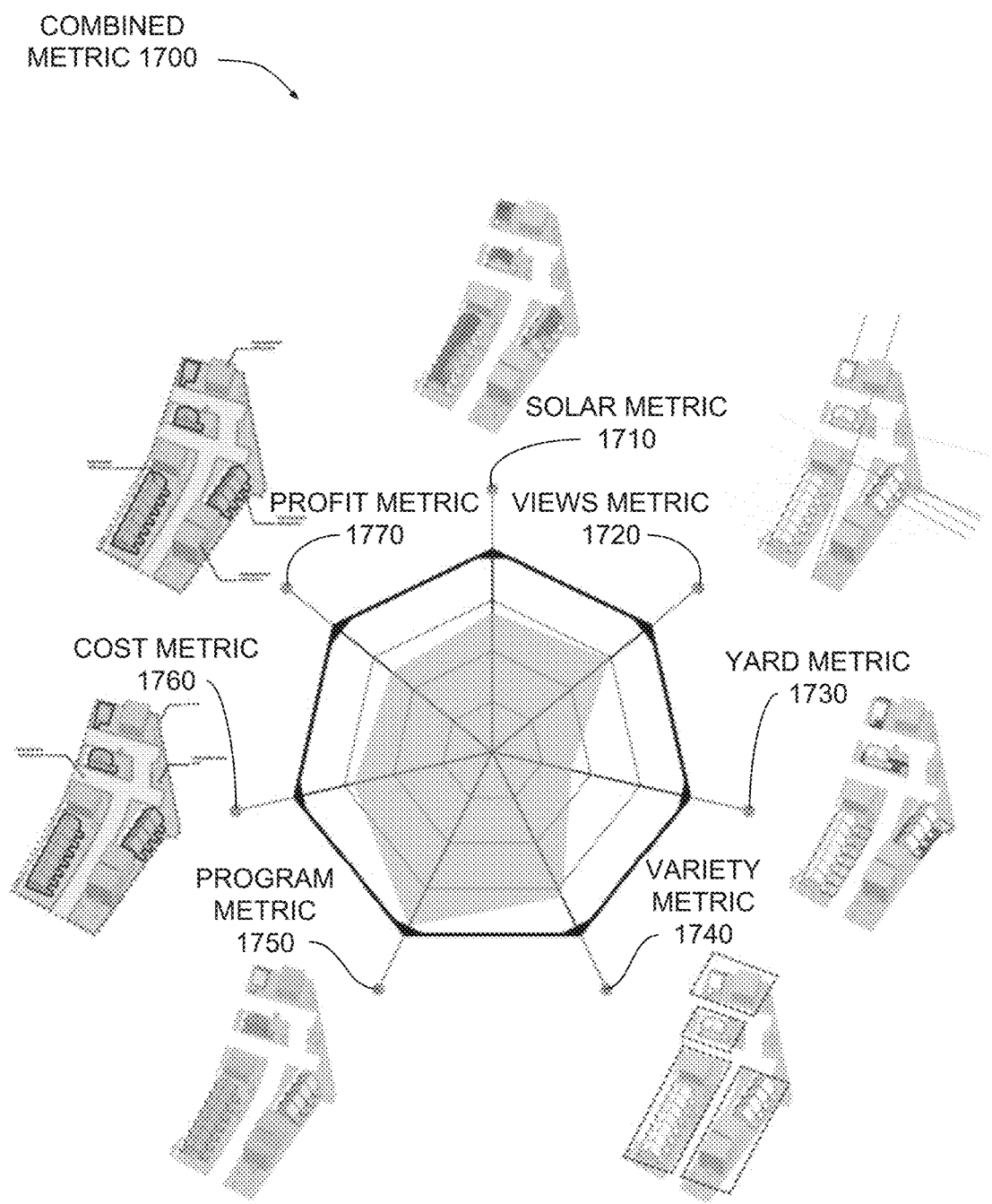
FIG. 17 illustrates how the evaluation engine of FIG. 2 generates a combined metric for a candidate design, according to various embodiments of the present invention.

Referring generally to FIGS. 10-16, evaluation engine 210 computes the different metrics discussed herein and then combines these metrics to produce an overall combined metric for candidate design 206, as illustrated in FIG. 17.

FIG. 17 illustrates how the evaluation engine of FIG. 2 generates a combined metric for a candidate design, according to various embodiments of the present invention. A shown, combined metric 1700 is derived from solar metric 1710, view metric 1720, yard metric 1730, variety metric 1740, program metric 1750, cost metric 1760, and profit metric 1770. Combined metric 1700 describes the degree to which candidate design 206 achieves design objectives 204. Design metrics 212 includes combined metric 1700 and/or the individual metrics associated with combined metric 1700. Various operations performed by evaluation engine 210 when computing these metrics is described in greater detail below in conjunction with FIG. 18.

Figure 18:
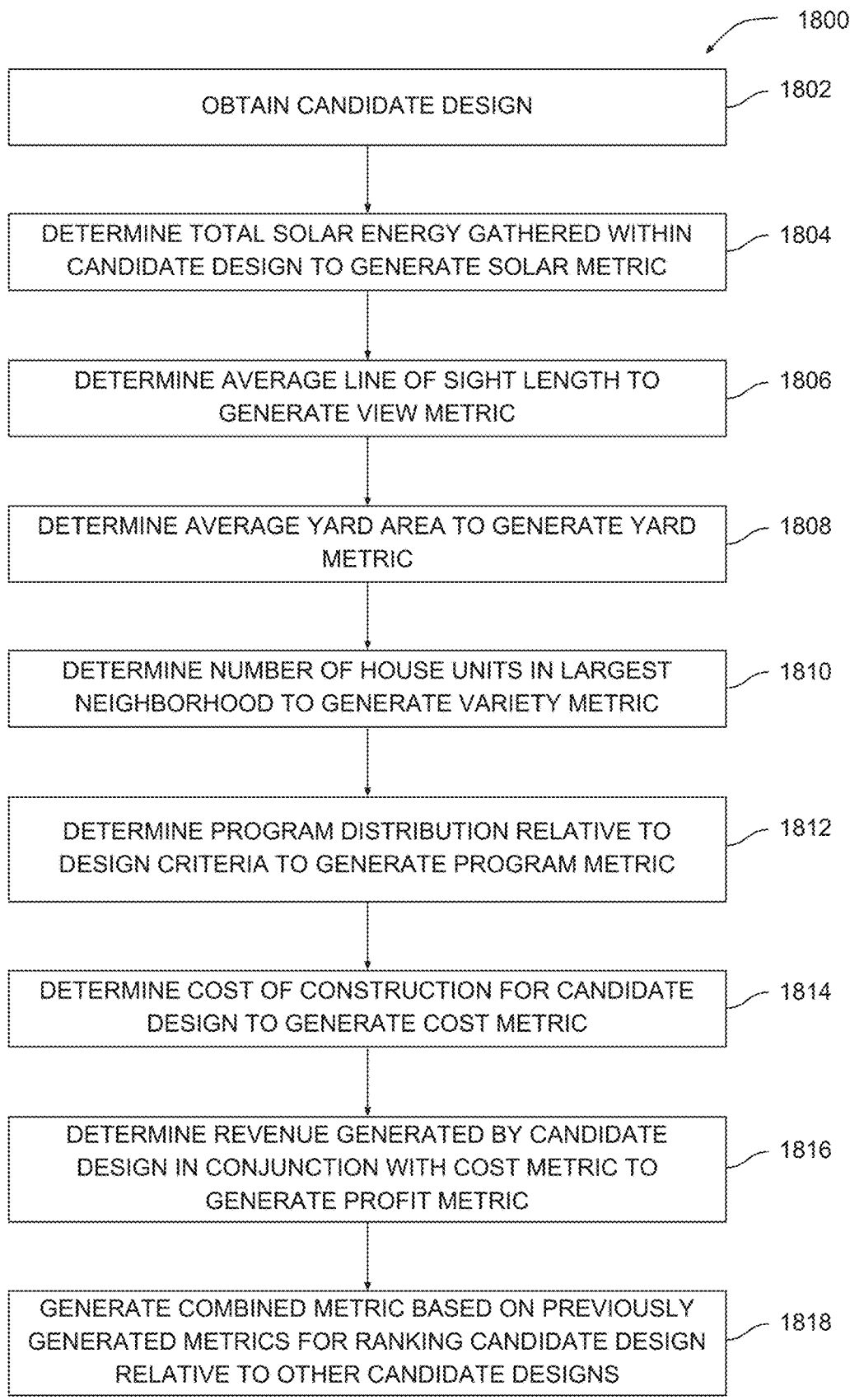
FIG. 18 is a flow diagram of method steps for evaluating candidate designs for an urban design project, according to various embodiments of the present invention.

FIG. 18 is a flow diagram of method steps for evaluating candidate designs for an urban design project, according to various embodiments of the present invention. Although the method steps are described in conjunction with the systems of FIGS. 1-17, persons skilled in the art will understand that any system configured to perform the method steps in any order falls within the scope of the present invention.

As shown, a method 1800 begins at step 1802, wherein evaluation engine 210 obtains a candidate design 206 generated by geometry engine 210. The candidate design 206 describes a layout of various fixtures associated with an urban design project, including various house units, apartment units, and roadways, among others.

At step 1804, evaluation engine 210 determines the total solar energy gathered within candidate design 206 to generate the solar metric. In one embodiment, evaluation engine 210 determines a ratio between potential solar energy that could be collected (based on the number of non-occluded sun rays) and the total number of available sun rays to generate the solar metric. Some units within the candidate design 206 produce more solar energy than others. The solar metric represents an aggregate of the solar energy generated across all units with within the candidate design 206. An example of how evaluation engine 210 generates the solar metric is described above in conjunction with FIG. 10.

At step 1806, evaluation engine 210 determines the average line of sight length across all house units and apartment units within the candidate design 206 to generate the view metric. Some lines of sight intersect obstacles and may therefore be shorter compared to lines of sight that do not intersect obstacles. Accordingly, certain house units or apartment units may have a longer line of sight compared to other units. Evaluation engine 210 totals the line of site lengths across all house units and apartment units and divides by the total number of units to generate the view metric. An example of how evaluation engine 210 generates the view metric is described above in conjunction with FIG. 11.

At step 1808, evaluation engine 210 determines the average yard area across all house units to generate the yard metric. Some house units have larger yards than others due to the uncertain nature of the generative design process. Evaluation engine 210 sums the area of all yards associated with house units with the candidate design 206 and divides by the number of house units to generate the yard metric. An example of how evaluation engine 210 generates the yard metric is described above in conjunction with FIG. 12.

At step 1810, evaluation engine 210 determines the number of units in the largest neighborhood to generate the variety metric. The number of house units within the largest neighborhood generally indicates the level of variety to be expected in the layout of neighborhoods included in the candidate design 206. Specifically, candidate designs with many smaller neighborhoods tend to have more varied neighborhood layouts compared to candidate designs with several very large neighborhoods, which often have long rows of house units. An example of how evaluation engine 210 generates the variety metric is described above in conjunction with FIG. 13.

At step 1812, evaluation engine 210 determines the distribution of programs, including types of house units and types of apartment units, relative to program requirements indicated in design criteria 202. Design criteria 202 includes the available program types as well as minimum numbers of each type of unit to be included in candidate designs 206. Evaluation engine 206 generates the program metric based on how closely candidate design 206 matches the distribution of program types specified in design criteria 202.

At step 1814, evaluation engine 210 determines the cost of construction for candidate design 206 to generate the cost metric. Evaluation engine 210 tallies the individual costs for generating each type of fixture to generate the cost metric. In doing so, evaluation engine 210 computes the cost for constructing different types of fixtures based on the unit cost for an instance of the fixture, a cost per unit area associated with the fixture, or a cost per linear unit associated with the fixture, among others.

At step 1816, evaluation engine 210 determines the revenue generated by candidate design in conjunction with the cost metric generated at step 1814 to generate the profit metric. Evaluation 210 computes the revenue for any given fixture based on the estimated sale price for the fixture. Any given estimated sale price can be generated based on current market conditions, comparison to similar fixtures, or any other technically feasible approach to estimating value.

At step 1818, evaluation engine 210 generates a combined metric based on the solar metric, view metric, yard metric, variety metric, program metric, cost metric, and profit metric generated previously. The combined metric indicates the overall degree to which the candidate design achieves the design objectives 204. In one embodiment, the combined metric indicates a degree to which the design candidate 206 optimizes the objective functions specified within design objectives 204. In another embodiment, the combined metric is a weighted sum of the individually-generated metrics.

Once evaluation engine 210 generates the various metrics described above for each candidate design 206, geometry engine 200 analyzes these metrics in conjunction with the corresponding candidate designs 206 and then modifies those candidate designs 206 to improve the associated metrics. In one embodiment, geometry engine 200 implements a genetic algorithm or evolutionary algorithm to improve candidate designs based on the associated metrics. When candidate designs 206 improve sufficiently, geometry engine 200 determines that one or more convergence criteria have been met, and urban design pipeline 120 outputs design options 140 based on those candidate designs 206. In one embodiment, design options 140 include each candidate design 206 with metrics that exceed a given threshold. The metrics generated via the above process can be used to rank candidate designs 206 relative to one another. Accordingly, these metrics represent hard data based on which high performing candidate designs can be selected.

In sum, an urban design pipeline automatically generates design options for an urban design project. The urban design pipeline includes a geometry engine and an evaluation engine. The geometry engine analyzes design criteria and design objectives associated with the urban design project and then generates numerous candidate designs that meet the design criteria and optimize the design objectives. Each candidate design includes a specific layout of house units, apartment units, and roads configured in a manner that meets the design criteria and achieves the design objectives to a certain degree.

The evaluation engine evaluates each candidate design across a set of metrics to generate a combined metric. The combined metric for a given candidate design indicates the degree to which the candidate design meets the design criteria and optimizes the design objectives. The geometry engine modifies the candidate designs based on corresponding metrics to generate candidate designs that better meet the design criteria and more effectively achieve the design objectives. The geometry engine and evaluation engine operate iteratively in this manner until a convergence criterion is met and a final set of design options is generated. These design options better meet the design criteria and optimize the design objectives relative to the previously generated candidate designs.

At least one technological advantage of the disclosed urban design pipeline relative to the prior art is that design options are automatically generated that meet all design criteria and achieve all design objectives associated with an urban design project. Accordingly, a designer can generate designs using the urban design pipeline with minimal risk of generating underperforming designs regardless of the number of design criteria and design objectives involved. Another technological advantage is that the urban design pipeline generates quantifiable metrics that indicate the degree to which the design objectives are met, thereby enabling data-informed decisions about different designs to be made. Yet another technological advantage is that the disclosed urban design pipeline includes repeatable stages that can be easily adapted to other urban design projects with different design criteria and design objectives. Thus, the process of generating designs can be greatly expedited compared to conventional, manual techniques. These technological advantages represent one or more technological advancements over prior art approaches.

1. Some embodiments include a computer-implemented method for generating design options for an urban design project, the method comprising generating a first geometrical mesh for a first candidate design based on a first design criterion associated with a first region of land, subdividing the first geometrical mesh to generate a first plurality of neighborhoods, populating the first plurality of neighborhoods with a first set of dwelling units, generating a first metric for the first candidate design based on a first objective function, modifying the first candidate design based on the first metric to generate a first design option, and determining that a second metric generated for the first design option based on the first objective function exceeds the first metric, indicating that the first design option is a higher ranked design than the first candidate design.

2. The computer-implemented method of clause 1, wherein subdividing the first geometrical mesh comprises projecting at least one line segment across the first geometrical mesh to generate a first neighborhood included in the first plurality of neighborhoods and a second neighborhood included in the first plurality of neighborhoods, and further comprising designating the at least one line segment as a roadway for accessing both the first neighborhood and the second neighborhood.

3. The computer-implemented method of any of clauses 1-2, wherein populating the first plurality of neighborhoods comprises determining that a first neighborhood included in the first plurality of neighborhoods has an area that is greater than a minimum area, identifying a first subregion within the first neighborhood, assigning the first subregion to a first dwelling unit included in the first set of dwelling units, and assigning a first dwelling unit type to the first dwelling unit.

4. The computer-implemented method of any of clauses 1-3, wherein generating the first metric comprises determining an estimated amount of solar energy collected by the first set of dwelling units.

5. The computer-implemented method of any of clauses 1-4, wherein generating the first metric comprises determining a first length associated with a first line of sight emanating from a first dwelling unit included in the first set of dwelling units, determining a second length associated with a second line of sight emanating from a second dwelling unit included in the first set of dwelling units, combining the first line of sight length with the second line of sight length to generate at least a portion of the first metric.

6. The computer-implemented method of any of clauses 1-5, wherein generating the first metric comprises determining a first yard size associated with a first dwelling unit included in the first set of dwelling units, determining a second yard size associated with a second dwelling unit included in the first set of dwelling units, and combining the first yard size with the second yard size to generate at least a portion of the first metric.

7. The computer-implemented method of any of clauses 1-6, wherein generating the first metric comprises determining that a first neighborhood included in the first plurality of neighborhoods includes more dwelling units than a second neighborhood included in the first plurality of neighborhoods, and computing a number of dwelling units included in the first neighborhood to generate at least a portion of the first metric, wherein the number of dwelling units included in the first neighborhood indicates a degree of variability in neighborhoods included in the first candidate design.

8. The computer-implemented method of any of clauses 1-7, wherein generating the first metric comprises determining that a first number of dwelling units included in the first set of dwelling units are assigned a first dwelling unit type, and determining a difference between the first number of dwelling units and a recommended number of dwelling units that should be assigned the first dwelling unit type to generate at least a portion of the first metric, wherein the difference between the first number of dwelling units and a recommended number of dwelling units indicates a degree to which the first candidate design meets a second design criterion.

9. The computer-implemented method of any of clauses 1-8, wherein generating the first metric comprises determining a first construction cost associated with a first dwelling unit included in the first set of dwelling units, determining a second construction cost associated with a second dwelling unit included in the first set of dwelling units, and combining the first construction cost with the second construction cost to generate at least a portion of the first metric.

10. The computer-implemented method of any of clauses 1-9, wherein generating the first metric comprises determining a first estimated revenue associated with a first dwelling unit included in the first set of dwelling units, determining a first estimated profit associated with the first dwelling unit based on the first estimated revenue and a first construction cost associated with the first dwelling unit, determining a second estimated revenue associated with a second dwelling unit included in the first set of dwelling units, determining a second estimated profit associated with the second dwelling unit based on the second estimated revenue and a second construction cost associated with the second dwelling unit, combining the first estimated profit with the second estimated profit to generate at least a portion of the first metric.

11. Some embodiments include a non-transitory computer-readable medium storing program instructions that, when executed by one or more processors, causes the one or more processors to generate design options for an urban design project by performing the steps of generating a first geometrical mesh for a first candidate design based on a first design criterion associated with a first region of land, subdividing the first geometrical mesh to generate a first plurality of neighborhoods, populating the first plurality of neighborhoods with a first set of dwelling units, generating a first metric for the first candidate design based on a first objective function, modifying the first candidate design based on the first metric to generate a first design option, and determining that a second metric generated for the first design option based on the first objective function exceeds the first metric, indicating that the first design option is a higher ranked design than the first candidate design.

12. The non-transitory computer-readable medium of clause 11, wherein the first design criterion defines a property boundary associated with the first region of land, and the first geometrical mesh is generated within an area that is defined by the property boundary.

13. The non-transitory computer-readable medium of any of clauses 11-12, wherein the step of populating the first plurality of neighborhoods comprises determining that a first neighborhood included in the first plurality of neighborhoods has an area that is greater than a minimum area, identifying a first subregion within the first neighborhood, assigning the first subregion to a first dwelling unit included in the first set of dwelling units, wherein the first dwelling unit has a first dwelling unit type, determining that a second neighborhood included in the first plurality of neighborhoods has an area that is less than the minimum area, identifying a second subregion within the second neighborhood, and assigning the second subregion to a second dwelling unit included in the first set of dwelling units, wherein the second dwelling unit has a second dwelling unit type.

14. The non-transitory computer-readable medium of any of clauses 11-13, wherein the step of generating the first metric comprises determining a first length associated with a first line of sight emanating from a first dwelling unit included in the first set of dwelling units, determining a second length associated with a second line of sight emanating from a second dwelling unit included in the first set of dwelling units, combining the first line of sight length with the second line of sight length to generate at least a portion of the first metric.

15. The non-transitory computer-readable medium of any of clauses 11-14, wherein the step of generating the first metric comprises determining a first yard size associated with a first dwelling unit included in the first set of dwelling units, determining a second yard size associated with a second dwelling unit included in the first set of dwelling units, and combining the first yard size with the second yard size to generate at least a portion of the first metric.

16. The non-transitory computer-readable medium of any of clauses 11-15, wherein the step of generating the first metric comprises determining that a first neighborhood included in the first plurality of neighborhoods includes more dwelling units than a second neighborhood included in the first plurality of neighborhoods, and computing a number of dwelling units included in the first neighborhood to generate at least a portion of the first metric, wherein the number of dwelling units included in the first neighborhood indicates a degree of variability in neighborhoods included in the first candidate design.

17. The non-transitory computer-readable medium of any of clauses 11-16, wherein the step of generating the first metric comprises determining that a first number of dwelling units included in the first set of dwelling units are assigned a first dwelling unit type, and determining a difference between the first number of dwelling units and a recommended number of dwelling units that should be assigned the first dwelling unit type to generate at least a portion of the first metric, wherein the difference between the first number of dwelling units and a recommended number of dwelling units indicates a degree to which the first candidate design meets a second design criterion.

18. The non-transitory computer-readable medium of any of clauses 11-17, wherein the step of generating the first metric comprises determining a first construction cost associated with a first dwelling unit included in the first set of dwelling units, determining a second construction cost associated with a second dwelling unit included in the first set of dwelling units, and combining the first construction cost with the second construction cost to generate at least a portion of the first metric.

19. The non-transitory computer-readable medium of any of clauses 11-18, wherein the step of generating the first metric comprises determining a first estimated revenue associated with a first dwelling unit included in the first set of dwelling units, determining a first estimated profit associated with the first dwelling unit based on the first estimated revenue and a first construction cost associated with the first dwelling unit, determining a second estimated revenue associated with a second dwelling unit included in the first set of dwelling units, determining a second estimated profit associated with the second dwelling unit based on the second estimated revenue and a second construction cost associated with the second dwelling unit, and combining the first estimated profit with the second estimated profit to generate at least a portion of the first metric.

20. Some embodiments include a system, comprising a memory storing an urban design pipeline, and a processor that, when executing the urban design pipeline, is configured to perform the steps of generating a first geometrical mesh for a first candidate design based on a first design criterion associated with a first region of land, subdividing the first geometrical mesh to generate a first plurality of neighborhoods, populating the first plurality of neighborhoods with a first set of dwelling units, generating a first metric for the first candidate design based on a first objective function, modifying the first candidate design based on the first metric to generate a first design option, and determining that a second metric generated for the first design option based on the first objective function exceeds the first metric, indicating that the first design option is a higher ranked design than the first candidate design.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating design options for an urban design project, the method comprising:
    generating a first geometrical mesh for a first candidate design based on a first design criterion associated with a first region of land;
    subdividing the first geometrical mesh to generate a first plurality of neighborhoods;
    populating the first plurality of neighborhoods with a first set of dwelling units;
    generating a first metric for the first candidate design based on a first objective function;
    modifying the first candidate design based on the first metric to generate a first design option; and
    determining that a second metric generated for the first design option based on the first objective function exceeds the first metric, indicating that the first design option is a higher ranked design than the first candidate design.

2. The computer-implemented method of claim 1, wherein subdividing the first geometrical mesh comprises projecting at least one line segment across the first geometrical mesh to generate a first neighborhood included in the first plurality of neighborhoods and a second neighborhood included in the first plurality of neighborhoods, and further comprising designating the at least one line segment as a roadway for accessing both the first neighborhood and the second neighborhood.

3. The computer-implemented method of claim 1, wherein populating the first plurality of neighborhoods comprises:
    determining that a first neighborhood included in the first plurality of neighborhoods has an area that is greater than a minimum area;
    identifying a first subregion within the first neighborhood;
    assigning the first subregion to a first dwelling unit included in the first set of dwelling units; and
    assigning a first dwelling unit type to the first dwelling unit.

4. The computer-implemented method of claim 1, wherein generating the first metric comprises determining an estimated amount of solar energy collected by the first set of dwelling units.

5. The computer-implemented method of claim 1, wherein generating the first metric comprises:
    determining a first length associated with a first line of sight emanating from a first dwelling unit included in the first set of dwelling units;
    determining a second length associated with a second line of sight emanating from a second dwelling unit included in the first set of dwelling units;
    combining the first line of sight length with the second line of sight length to generate at least a portion of the first metric.

6. The computer-implemented method of claim 1, wherein generating the first metric comprises:
    determining a first yard size associated with a first dwelling unit included in the first set of dwelling units;
    determining a second yard size associated with a second dwelling unit included in the first set of dwelling units; and
    combining the first yard size with the second yard size to generate at least a portion of the first metric.

7. The computer-implemented method of claim 1, wherein generating the first metric comprises:
    determining that a first neighborhood included in the first plurality of neighborhoods includes more dwelling units than a second neighborhood included in the first plurality of neighborhoods; and
    computing a number of dwelling units included in the first neighborhood to generate at least a portion of the first metric,
    wherein the number of dwelling units included in the first neighborhood indicates a degree of variability in neighborhoods included in the first candidate design.

8. The computer-implemented method of claim 1, wherein generating the first metric comprises:
    determining that a first number of dwelling units included in the first set of dwelling units are assigned a first dwelling unit type; and
    determining a difference between the first number of dwelling units and a recommended number of dwelling units that should be assigned the first dwelling unit type to generate at least a portion of the first metric,
    wherein the difference between the first number of dwelling units and a recommended number of dwelling units indicates a degree to which the first candidate design meets a second design criterion.

9. The computer-implemented method of claim 1, wherein generating the first metric comprises:
   determining a first construction cost associated with a first dwelling unit included in the first set of dwelling units;
   determining a second construction cost associated with a second dwelling unit included in the first set of dwelling units; and
   combining the first construction cost with the second construction cost to generate at least a portion of the first metric.

10. The computer-implemented method of claim 1, wherein generating the first metric comprises:
    determining a first estimated revenue associated with a first dwelling unit included in the first set of dwelling units;
    determining a first estimated profit associated with the first dwelling unit based on the first estimated revenue and a first construction cost associated with the first dwelling unit;
    determining a second estimated revenue associated with a second dwelling unit included in the first set of dwelling units;
    determining a second estimated profit associated with the second dwelling unit based on the second estimated revenue and a second construction cost associated with the second dwelling unit;
    combining the first estimated profit with the second estimated profit to generate at least a portion of the first metric.

11. A non-transitory computer-readable medium storing program instructions that, when executed by one or more processors, causes the one or more processors to generate design options for an urban design project by performing the steps of:
    generating a first geometrical mesh for a first candidate design based on a first design criterion associated with a first region of land;
    subdividing the first geometrical mesh to generate a first plurality of neighborhoods;
    populating the first plurality of neighborhoods with a first set of dwelling units;
    generating a first metric for the first candidate design based on a first objective function;
    modifying the first candidate design based on the first metric to generate a first design option; and
    determining that a second metric generated for the first design option based on the first objective function exceeds the first metric, indicating that the first design option is a higher ranked design than the first candidate design.

12. The non-transitory computer-readable medium of claim 11, wherein the first design criterion defines a property boundary associated with the first region of land, and the first geometrical mesh is generated within an area that is defined by the property boundary.

13. The non-transitory computer-readable medium of claim 11, wherein the step of populating the first plurality of neighborhoods comprises:
    determining that a first neighborhood included in the first plurality of neighborhoods has an area that is greater than a minimum area;
    identifying a first subregion within the first neighborhood;
    assigning the first subregion to a first dwelling unit included in the first set of dwelling units, wherein the first dwelling unit has a first dwelling unit type;
    determining that a second neighborhood included in the first plurality of neighborhoods has an area that is less than the minimum area;
    identifying a second subregion within the second neighborhood; and
    assigning the second subregion to a second dwelling unit included in the first set of dwelling units, wherein the second dwelling unit has a second dwelling unit type.

14. The non-transitory computer-readable medium of claim 11, wherein the step of generating the first metric comprises:
    determining a first length associated with a first line of sight emanating from a first dwelling unit included in the first set of dwelling units;
    determining a second length associated with a second line of sight emanating from a second dwelling unit included in the first set of dwelling units;
    combining the first line of sight length with the second line of sight length to generate at least a portion of the first metric.

15. The non-transitory computer-readable medium of claim 11, wherein the step of generating the first metric comprises:
    determining a first yard size associated with a first dwelling unit included in the first set of dwelling units;
    determining a second yard size associated with a second dwelling unit included in the first set of dwelling units; and
    combining the first yard size with the second yard size to generate at least a portion of the first metric.

16. The non-transitory computer-readable medium of claim 11, wherein the step of generating the first metric comprises:
    determining that a first neighborhood included in the first plurality of neighborhoods includes more dwelling units than a second neighborhood included in the first plurality of neighborhoods; and
    computing a number of dwelling units included in the first neighborhood to generate at least a portion of the first metric,
    wherein the number of dwelling units included in the first neighborhood indicates a degree of variability in neighborhoods included in the first candidate design.

17. The non-transitory computer-readable medium of claim 11, wherein the step of generating the first metric comprises:
    determining that a first number of dwelling units included in the first set of dwelling units are assigned a first dwelling unit type; and
    determining a difference between the first number of dwelling units and a recommended number of dwelling units that should be assigned the first dwelling unit type to generate at least a portion of the first metric,
    wherein the difference between the first number of dwelling units and a recommended number of dwelling units indicates a degree to which the first candidate design meets a second design criterion.

18. The non-transitory computer-readable medium of claim 11, wherein the step of generating the first metric comprises:
    determining a first construction cost associated with a first dwelling unit included in the first set of dwelling units;
    determining a second construction cost associated with a second dwelling unit included in the first set of dwelling units; and combining the first construction cost with the second construction cost to generate at least a portion of the first metric.

19. The non-transitory computer-readable medium of claim 11, wherein the step of generating the first metric comprises:
   determining a first estimated revenue associated with a first dwelling unit included in the first set of dwelling units;
   determining a first estimated profit associated with the first dwelling unit based on the first estimated revenue and a first construction cost associated with the first dwelling unit;
   determining a second estimated revenue associated with a second dwelling unit included in the first set of dwelling units;
   determining a second estimated profit associated with the second dwelling unit based on the second estimated revenue and a second construction cost associated with the second dwelling unit; and
   combining the first estimated profit with the second estimated profit to generate at least a portion of the first metric.

20. A system, comprising:
   a memory storing an urban design pipeline; and
   a processor that, when executing the urban design pipeline, is configured to perform the steps of:
      generating a first geometrical mesh for a first candidate design based on a first design criterion associated with a first region of land,
      subdividing the first geometrical mesh to generate a first plurality of neighborhoods,
      populating the first plurality of neighborhoods with a first set of dwelling units,
      generating a first metric for the first candidate design based on a first objective function,
      modifying the first candidate design based on the first metric to generate a first design option, and
      determining that a second metric generated for the first design option based on the first objective function exceeds the first metric, indicating that the first design option is a higher ranked design than the first candidate design.

* * * * *